(12) United States Patent
Yamamoto et al.

(10) Patent No.: US 9,470,124 B2
(45) Date of Patent: Oct. 18, 2016

(54) SUB-MUFFLER AND MANUFACTURING METHOD OF SUB-MUFFLER

(71) Applicant: TOYOTA JIDOSHA KABUSHIKI KAISHA, Toyota-shi (JP)

(72) Inventors: Akiyoshi Yamamoto, Nisshin (JP); Hideki Homma, Inuyama (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/704,420

(22) Filed: May 5, 2015

(65) Prior Publication Data

US 2015/0322831 A1 Nov. 12, 2015

(30) Foreign Application Priority Data

May 8, 2014 (JP) ................. 2014-096758

(51) Int. Cl.
*F01N 13/18* (2010.01)
*F01N 1/08* (2006.01)
*B60K 13/04* (2006.01)
*B21D 22/02* (2006.01)
*B21D 22/14* (2006.01)

(52) U.S. Cl.
CPC ............ *F01N 1/08* (2013.01); *B21D 22/025* (2013.01); *B21D 22/14* (2013.01); *B60K 13/04* (2013.01); *F01N 13/18* (2013.01); *F01N 13/1872* (2013.01); *F01N 2470/06* (2013.01); *F01N 2470/10* (2013.01); *F01N 2470/26* (2013.01); *Y10T 29/494* (2015.01)

(58) Field of Classification Search
CPC .................................................. F01N 13/1872
USPC ........................................... 181/282, 228, 227
See application file for complete search history.

(56) References Cited

U.S. PATENT DOCUMENTS

| | | | | |
|---|---|---|---|---|
| 4,909,348 A * | 3/1990 | Harwood et al. | | 181/282 |
| 8,505,678 B2 * | 8/2013 | Wheeler | | 181/212 |
| 2005/0167968 A1 * | 8/2005 | Mabuchi et al. | | 280/781 |
| 2007/0240932 A1 * | 10/2007 | Van De Flier et al. | | 181/228 |
| 2008/0022741 A1 * | 1/2008 | Arai | | 72/82 |
| 2009/0038879 A1 * | 2/2009 | Sato et al. | | 181/228 |
| 2009/0127025 A1 * | 5/2009 | Rimback | | 181/282 |
| 2012/0325578 A1 * | 12/2012 | Giaume | | 181/282 |
| 2014/0151149 A1 * | 6/2014 | Ross et al. | | 181/282 |
| 2014/0353077 A1 * | 12/2014 | Uchida | | 181/228 |
| 2015/0152773 A1 * | 6/2015 | Shibuki et al. | | 181/228 |

FOREIGN PATENT DOCUMENTS

EP 1 245 303 A2 10/2002
JP H 4-185587 7/1992

(Continued)

*Primary Examiner* — Forrest M Phillips
(74) *Attorney, Agent, or Firm* — Oblon, McClelland, Maier & Neustadt, L.L.P.

(57) ABSTRACT

A manufacturing method of a sub-muffler includes a rectangular tubular body shaping step, a preliminary shaping step, and a diameter reduction shaping step. In the rectangular tubular body shaping step, a plate material is bent and a rectangular tubular body having a rectangular shape in cross section is thereby formed. In the preliminary shaping step, ends of the rectangular tubular body are preliminarily formed and the end parts of the tubular body are thereby formed so that its cross-sectional shape becomes a circular shape. In the diameter reduction shaping step, the diameters of the ends of the rectangular tubular body are reduced.

7 Claims, 32 Drawing Sheets

(56) References Cited

FOREIGN PATENT DOCUMENTS

| JP | 2000-317533 A | 11/2000 |
| JP | 2002-347664 | 12/2002 |
| JP | 2002-361342 | 12/2002 |
| JP | 2004-001023 | 1/2004 |
| JP | 2004-243354 A | 9/2004 |
| JP | 2004-360531 | 12/2004 |
| JP | 2005-297041 | 10/2005 |
| WO | WO 85/01985 A1 | 5/1985 |
| WO | WO 2005/056210 A1 | 6/2005 |

\* cited by examiner

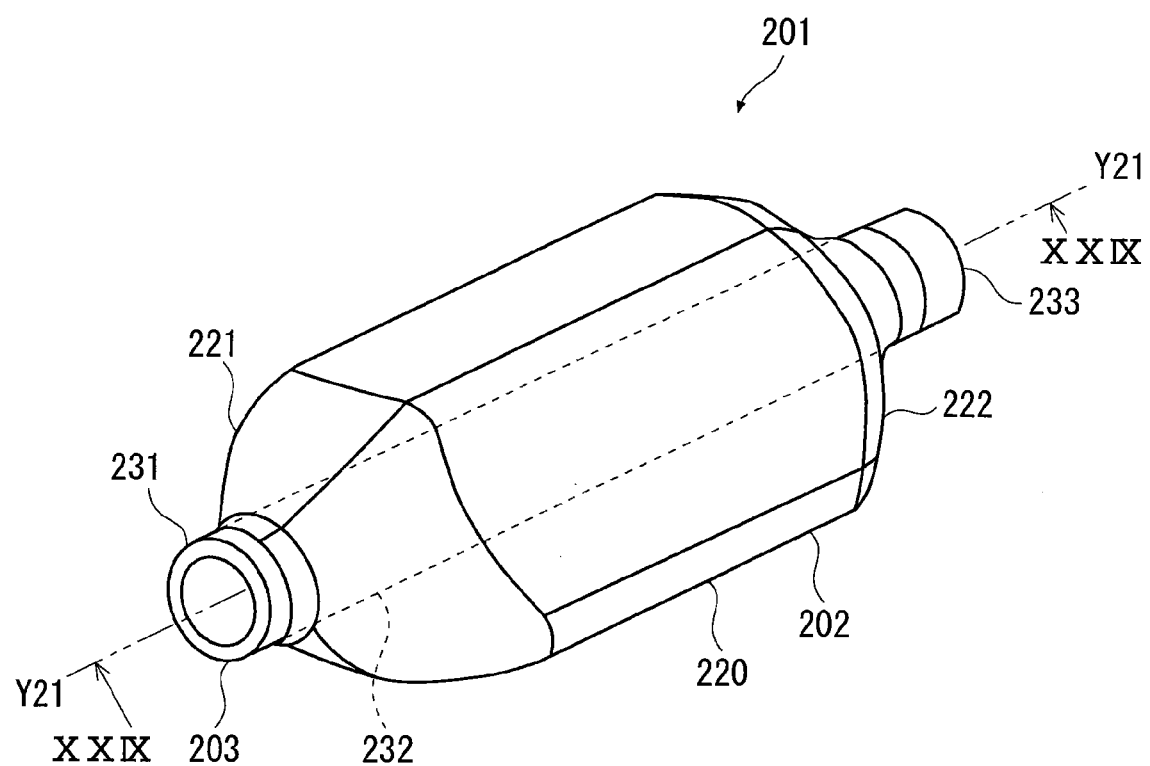
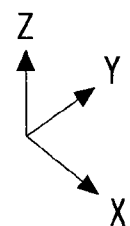
Fig. 28

SUB-MUFFLER AND MANUFACTURING METHOD OF SUB-MUFFLER

INCORPORATION BY REFERENCE

This application is based upon and claims the benefit of priority from Japanese patent application No. 2014-096758, filed on May 8, 2014, the disclosure of which is incorporated herein in its entirety by reference.

BACKGROUND OF THE INVENTION

1. Field of the Invention

The present invention relates to a sub-muffler incorporated into an exhaust system of an automobile.

2. Description of Related Art

A sub-muffler integrated into an exhaust system of an automobile is often housed and disposed in a floor tunnel section that is formed so as to extend in the front/back direction of the vehicle (a space recessed in the vehicle interior direction) on the under surface of the floor of the vehicle.

For example, Japanese Unexamined Patent Application Publication No. 2002-347664 discloses a sub-muffler with a recess formed on the upper side thereof and having curved sides as shown in its FIG. 6. In particular, the sub-muffler is disposed in a recessed part of a floor panel in such a manner that the under surface of the sub-muffler is roughly flush with the under surface of the floor of the vehicle. Further, a recess extending in the vehicle front/back direction is formed at the center in the vehicle width direction on the upper surface of the sub-muffler. Further, a space is formed between the recess and a propeller shaft extending in the front/back direction above the recess and having a circular shape in cross section. This space allows air to flow easily from the front of the vehicle to the back thereof.

SUMMARY OF THE INVENTION

It should be noted that a sub-muffler is connected to a catalyst converter and/or a main muffler through a pipe having a diameter smaller than that of the sub-muffler.

The inventors of the present application have examined a method in which a spinning machining is performed on both ends of a sub-muffler to reduce the cross sectional areas thereof and thereby conform the cross section of the ends to those of pipes so that the pipes can be connected to both ends of the sub-muffler. (In this specification, the term "machining" includes "shaping", "deforming", and so on by using a machine.) However, the inventors have found a problem that when a spinning machining is simply performed on the ends of a sub-muffler having a rectangular outer shape in cross section, wrinkling and cracking occur.

Next, the inventors of the present application have also examined a method in which, for example, separate connection components such as pressed articles are attached to the ends of a sub-muffler by using a welding process or a crimping process, and the sub-muffler is connected to pipes through the connection components. However, the inventors have found that since this method requires separate connection components, the yield rate is lowered. Further, in many cases, the floor tunnel section formed in the vehicle has a rectangular shape (trapezoidal shape) in cross section. Therefore, when the outer shape of the sub-muffler is not conformed to the shape of the recess of the floor tunnel section, a large gap is formed between the wall surface of the floor tunnel section and the outer shape of the sub-muffler. Therefore, this gap cannot be effectively used as the volume of the sub-muffler.

The present invention has been made in view of the above-described circumstances, and an object thereof is to make it possible to manufacture sub-mufflers with a high yield rate and mount a sub-muffler on a vehicle with a larger sub-muffler volume.

A first exemplary aspect of the present invention is a manufacturing method of a sub-muffler including:

a rectangular tubular body shaping step of bending a plate material and thereby forming a rectangular tubular body having a rectangular shape in cross section (e.g., roll shaping step S3);

a preliminary shaping step of preliminarily shaping an end part of the rectangular tubular body and thereby shaping a cross-sectional shape of the end part of the rectangular tubular body into a circular shape (e.g., both end press shaping step S5, circular spinning machining step S26); and a diameter reduction shaping step of reducing a diameter of the end part of the rectangular tubular body (e.g., spinning machining step S7, diameter reduction spinning machining step S27).

The above-described configuration makes it possible to manufacture sub-mufflers with a high yield rate.

Further, in the preliminary shaping step, a circular spinning machining in which a rotating roller is moved along a circular trajectory while pressing the rotating roller onto the end part of the rectangular tubular body may be performed after performing a rectangular spinning machining in which the rotating roller is moved along a rectangular trajectory while pressing the rotating roller onto the end part of the rectangular tubular body. Further, in the diameter reduction shaping step, a circular spinning machining in which a rotating roller is moved along a circular trajectory while pressing the rotating roller onto the end part of the rectangular tubular body may be performed. Further, in the preliminary shaping step, the trajectory of the rotating roller may be gradually changed from a rectangular shape into a circular shape. Further, in the preliminary shaping step, a press shaping may be performed by using an inner press die and an outer press die.

Further, another exemplary aspect of the present invention is a sub-muffler manufactured by using any one of the above-described manufacturing methods.

The above-described configuration makes it possible to provide sub-mufflers that can be manufactured with a high yield rate.

Further, another exemplary aspect of the present invention is a sub-muffler having a rectangular shape in cross section, the sub-muffler being housed in a floor tunnel extending in a longitudinal direction of a vehicle, the sub-muffler including:

a main body having a rectangular outer shape in cross section in a continuous fashion over its length in a longitudinal direction;

a first end part extending on a side of an inflow pipe (e.g., a flow path pipe 3, a flow path pipe 203), a cross sectional area of the first end part becoming smaller toward one side in the longitudinal direction of the main body, the inflow pipe being configured to feed exhaust into the main body; and a second end part extending on a side of a discharging pipe (e.g., a flow path pipe 3, a flow path pipe 203, a pipe 52), a cross sectional area of the second end part becoming smaller toward the other side thereof in the longitudinal direction of the main body, the discharging pipe being configured to discharge the exhaust from the main body, in which an outer shape of the main body is shaped so as to conform to a shape of a wall surface forming the floor tunnel, and hence when the main body is housed in the floor tunnel, a space formed between the wall surface and an outer surface of the main body is occupied by the main body so as to leave only a predetermined clearance therebetween.

This configuration makes it possible to achieve a high silencing effect.

Further, the main body and the first and second end parts may be formed from one plate raw material.

According to the present invention, it is possible to provide a manufacturing method of a sub-muffler that can make it possible to manufacture sub-mufflers with a high yield rate.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 28 is a perspective view of a sub-muffler according to a second exemplary embodiment;

DESCRIPTION OF THE EXEMPLARY EMBODIMENTS

First Exemplary Embodiment

Figure 1:
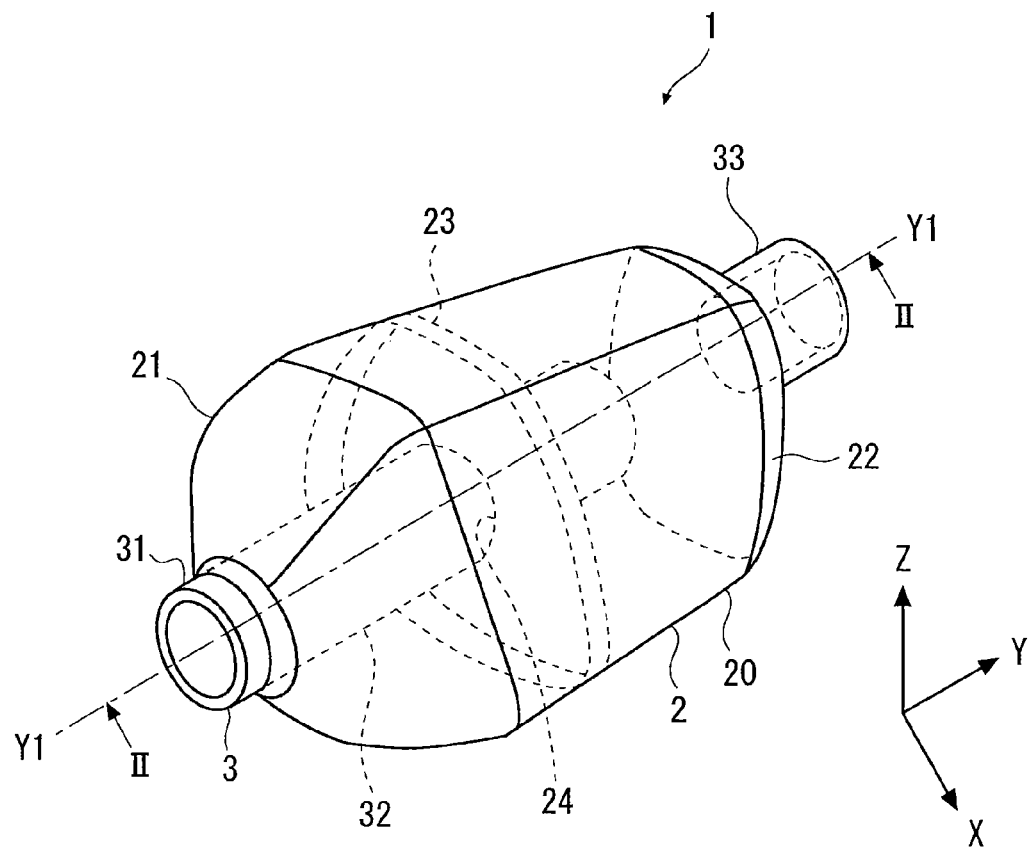
FIG. 1 is a perspective view of a sub-muffler according to a first exemplary embodiment.
Figure 2:
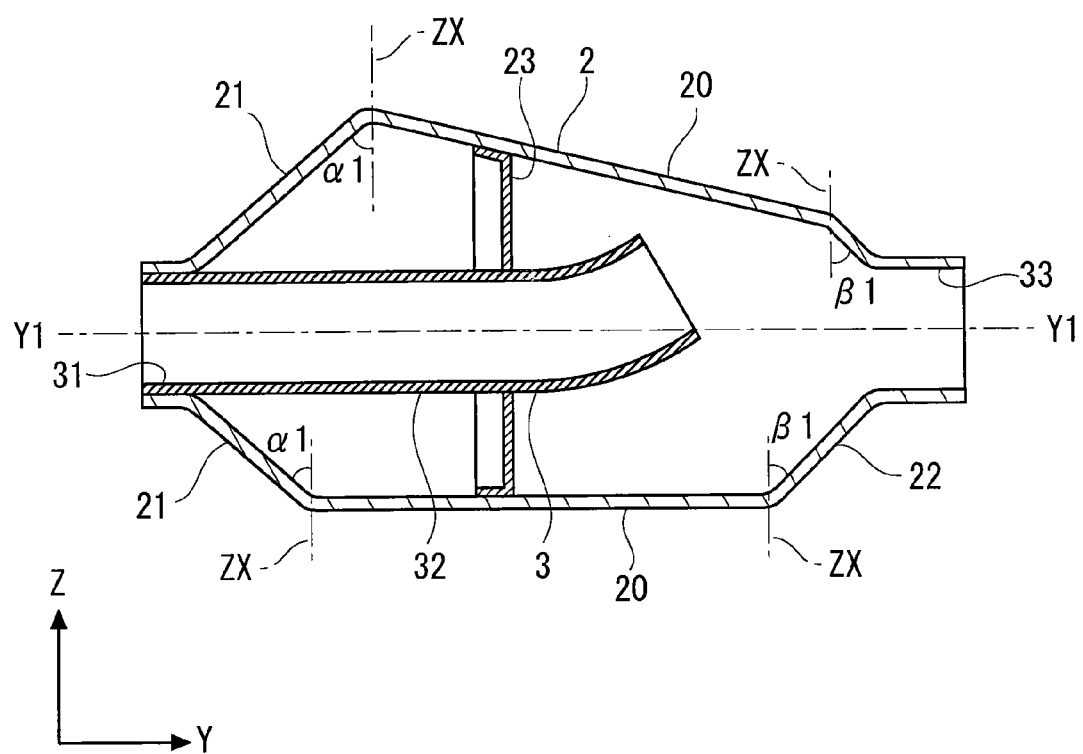
FIG. 2 is a cross section of the sub-muffler according to the first exemplary embodiment.
Figure 3:
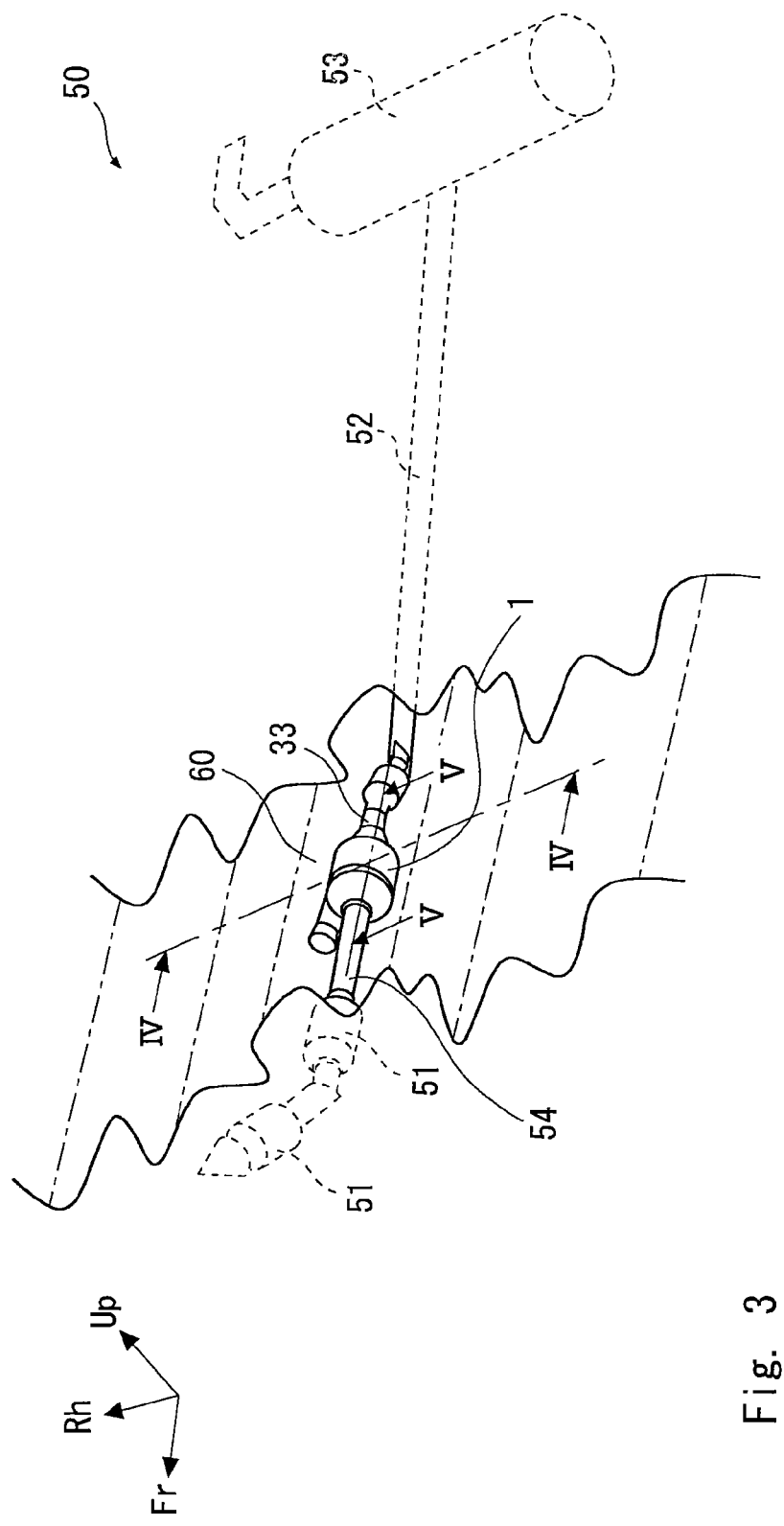
FIG. 3 is a figure showing a disposition of the sub-muffler according to the first exemplary embodiment.
Figure 4:
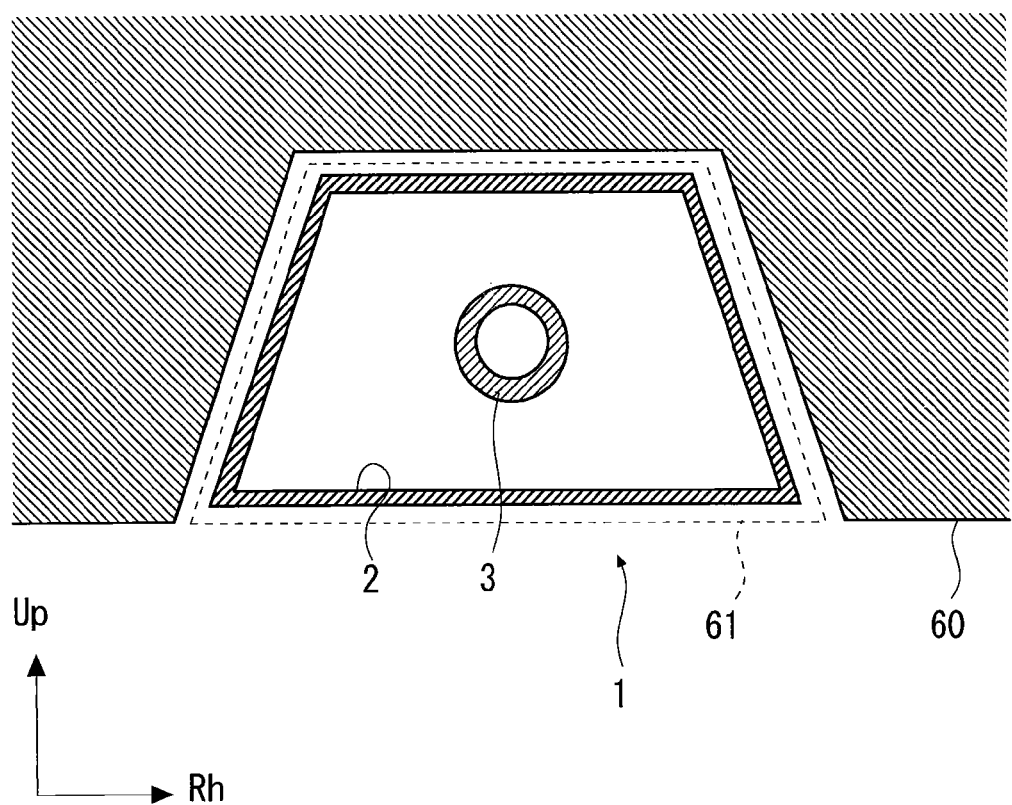
FIG. 4 is a cross section of the sub-muffler and a front floor tunnel section according to the first exemplary embodiment.
Figure 5:
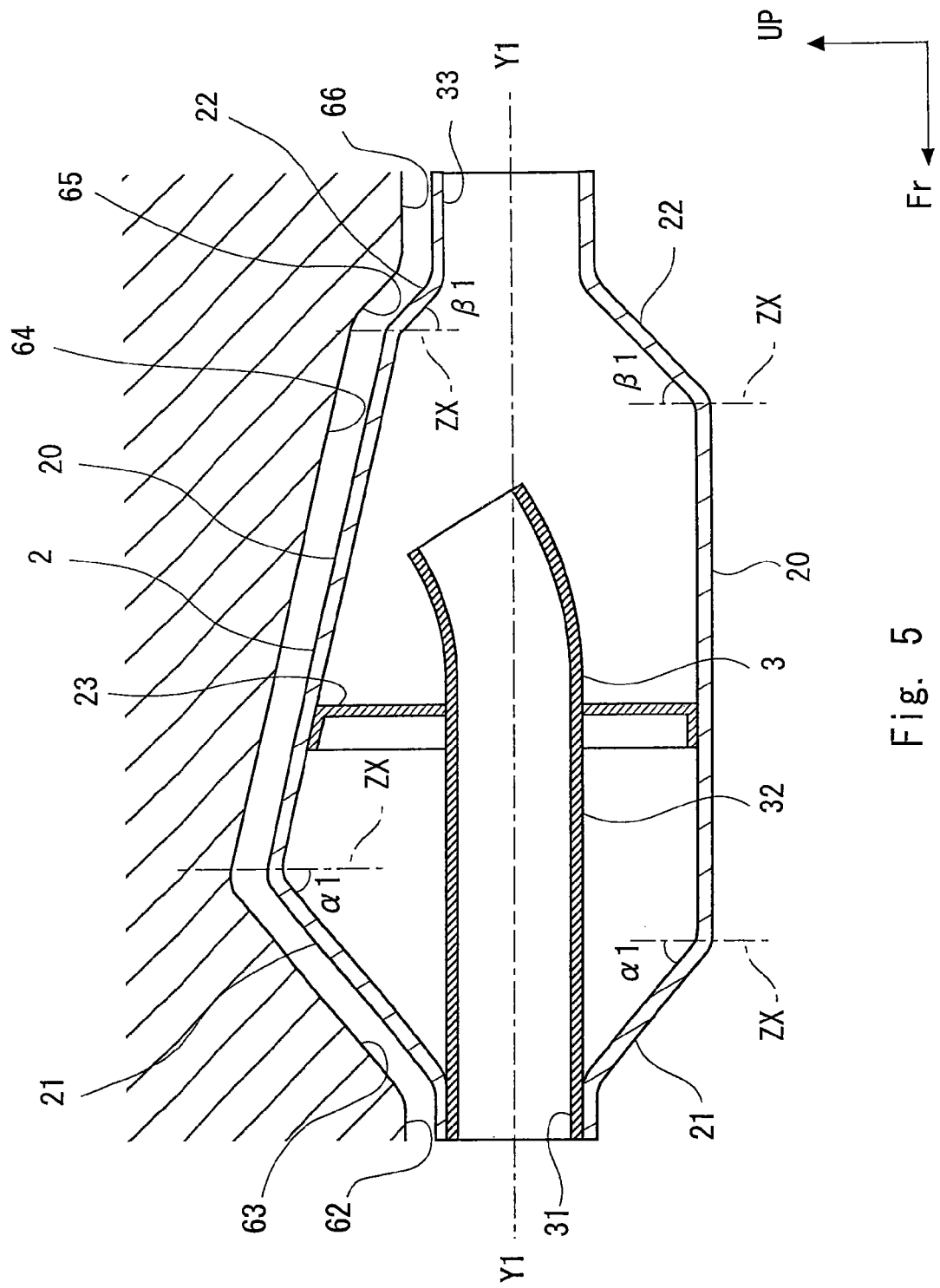
FIG. 5 is a cross section of the sub-muffler and the front floor tunnel section according to the first exemplary embodiment.
Figure 6:
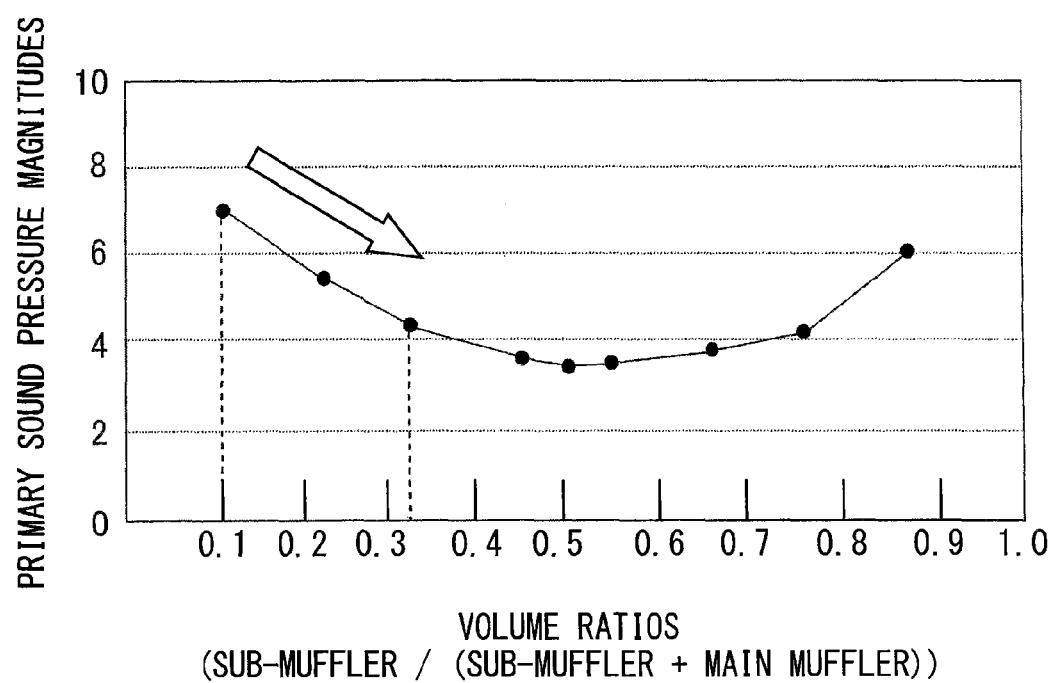
FIG. 6 is a graph showing primary sound pressure magnitudes of an exhaust sound with respect to volume ratios of a sub-muffler to the total volume of the sub-muffler and a main muffler.
Figure 31:
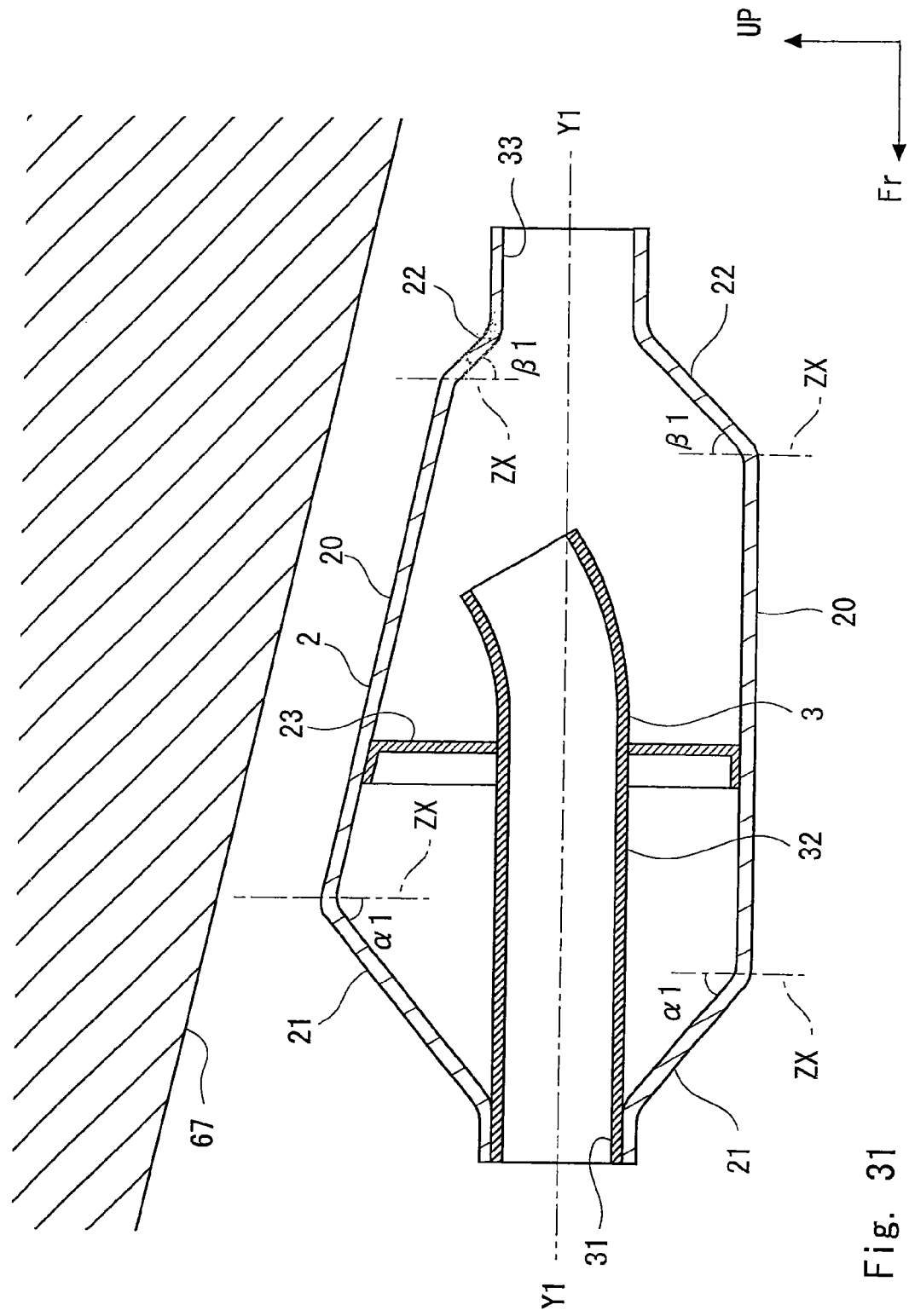
FIG. 31 is a cross section of a sub-muffler and a front floor tunnel section.

A sub-muffler according to a first exemplary embodiment is explained with reference to FIGS. 1 to 6. FIG. 1 is a perspective view of a sub-muffler. FIG. 2 is a cross section near a Y1-Y1 axis of the sub-muffler. FIG. 3 is a figure partially showing a disposition of the sub-muffler when the sub-muffler is mounted on a vehicle. FIGS. 4, 5 and 31 are cross sections of the sub-muffler and a front floor tunnel section. FIG. 6 is a graph showing primary sound pressure magnitudes of an exhaust sound with respect to volume ratios of a sub-muffler to the total volume of the sub-muffler and a main muffler (i.e., ratios of the volume of the sub-muffler to the total volume of the sub-muffler and the main muffler).

As shown in FIGS. 1 and 2, a sub-muffler 1 includes a tubular body 2, a separator 23, and a flow path pipe 3 (which may also be referred to as "inflow pipe" or "discharging pipe"). That is, the sub-muffler 1 is an example of a separator type sub-muffler including the separator 23.

The tubular body 2 has, for example, a roughly trapezoidal shape in cross section. The tubular body 2 is made of, for example, a metal material such as iron, titanium, aluminum, or an alloy thereof. Examples of the alloy include stainless steel. The flow path pipe 3 is inserted into the tubular body 2. The flow path pipe 3 has a central axis Y1. The central axis Y1 may pass through the center of gravity in the cross section of the tubular body 2. The tubular body 2 includes a central part 20 (which may also be referred to as "main body"), an end part 21 (which may also be referred to as "first end part") extending in one direction from the central part 20, and an end part 22 (which may also be referred to as "second end part") extending in the other direction.

The central part 20 has a roughly trapezoidal shape in cross section, and its cross section becomes smaller from the end part 21 toward the end part 22. The central part 20 includes a space inside thereof and this space functions as an expansion chamber. The inner diameter of the central part 20 is larger than the outer diameter of the flow path pipe 3. Further, the inner diameter of the parts of the ends parts 21 and 22 that are located closest to their ends is equal to or slightly larger than the outer diameter of the flow path pipe 3. The outer wall surface of the central part 20 is inclined toward the end part 22. In some cases, a bump-and-recess pattern may be formed on the outer wall surface of the tubular body 2 in order to increase its rigidity.

The diameter of the end parts 21 and 22 of the tubular body 2 is reduced so that they are closely attached to the outer circumferential surface of the flow path pipe 3. Each of the end parts 21 and 22 extends from the central part 20 in one of the longitudinal directions while its cross sectional area becomes smaller as the distance from the central part 20 increases. When an angle between the inner wall surface of the end part 21 and an imaginary plane ZX perpendicular to the central axis Y1 is referred to as "α1", the angle α1 is, for example, 0 to 90°. When an angle between the inner wall surface of the end part 22 and the outer circumferential surface of the flow path pipe 3 is referred to as "β1", the angle β1 is, for example, 0 to 90°. As described later, the central part 20 and the end parts 21 and 22 can be shaped by a spinning machining, and the angles α1 and β1 can be easily adjusted by the spinning machining.

The central part 20 and the end parts 21 and 22 are mutually formed as an integrated article. That is, the boundaries between the central part 20 and the end part 21 and between the central part 20 and the end part 22 are not formed by joining a plurality of members, e.g., two plate materials by welding or crimping, but are formed from one raw material (which may also be referred to as "one plate raw material") such as one plate material by performing a press shaping or a spinning machining. Therefore, the boundaries between the central part 20 and the end part 21 and between the central part 20 and the end part 22 can have a strength higher than that of boundaries formed by joining a plurality of members. The end part 22 is connected to a main muffler or the like through a pipe or the like, and exhaust fed from a suction part 31 flows to the downstream side through an outlet 33.

The separator 23 is disposed inside the tubular body 2 and divides the space inside the tubular body 2 into two sections, i.e., an expansion chamber on the end part 21 side and another expansion chamber on the end part 22 side. Further, a holding hole 24 is formed in the separator 23. The flow path pipe 3 is inserted into the holding hole 24 and thereby held by the separator 23.

The flow path pipe 3 includes a suction part 31 that is connected to a catalyst converter or the like, and a straight part 32 extending on a straight line from the suction part 31. Exhaust that has passed through the catalyst converter or the like is guided from the expansion chamber on the end part 21 side to the expansion chamber on the end part 22 side through the straight part 32. The straight part 32 may be a punching pipe in which a plurality of holes are formed. A sound absorption member (not shown) is disposed in the expansion chamber of the tubular body 2 and envelops the outer circumferential surface of the straight part 32. The sound absorption member is a member made of a material capable of absorbing sound energy and thereby absorbing the sound. Examples of the sound absorption member include glass-wool.

Next, a sub-muffler 1 incorporated into an exhaust system of an automobile is explained.

As shown in FIG. 3, an exhaust system 50 of an automobile includes a catalyst converter 51, the sub-muffler 1, a pipe 52 (which may also be referred to as "discharging pipe"), and a main muffler 53 connected to the pipe 52. The catalyst converter 51 is connected to an engine (not shown) through an exhaust pipe (not shown). The sub-muffler 1 is incorporated into the exhaust system 50 of the automobile by connecting the suction part 31 to the catalyst converter 51 through a pipe 54 and connecting the outlet 33 to the pipe 52. Further, the sub-muffler 1 supplements the silencing effect of the main muffler 53.

Note that the sub-muffler 1 is disposed, for example, directly below a front floor tunnel section 60 of the automobile. As shown in FIG. 4, the front floor tunnel section 60 has a difference in height in the width direction of the automobile (Rh-direction in FIG. 4). For example, a part of the front floor tunnel section 60 is recessed toward the vehicle interior, and hence the front floor tunnel section 60 includes a space 61, i.e., a recessed part having a roughly trapezoidal shape in cross section. Meanwhile, since the sub-muffler 1 has a roughly trapezoidal shape in cross section as described above, the sub-muffler 1 can be housed in the vacant space 61 in such a manner that gaps in the space 61 can be narrowed while avoiding interferences caused by obstacles located in the lower part of the automobile. Therefore, it can be ensured that the sub-muffler 1 has a larger volume compared to that of a typical sub-muffler having a roughly circular shape in cross section in related art.

Further, in some cases, the front floor tunnel section 60 has a difference in height in the front/back direction of the automobile as shown in FIG. 5. The front floor tunnel section 60 has, for example, roughly parallel surfaces 62 and 66 roughly in parallel with the road surface, and inclined surfaces 63, 64 and 65 connecting the roughly parallel surface 62 with the roughly parallel surface 66. The inclined surfaces 63, 64 and 65 are connected to one another in this listed order, and are inclined at mutually different angles. Meanwhile, the end part 21, the central part 20, and the end part 22 of the sub-muffler 1 have surfaces that roughly conform to the inclined surfaces 63, 64 and 65, respectively. The sub-muffler 1 is configured so that the space between the wall surface forming the front floor tunnel section 60 and the surface of the central part 20 is occupied by the central part 20 while leaving only a predetermined clearance therebetween. Therefore, it is possible to occupy the vacant space below the inclined surfaces 64, 65 and 66 by the central part 20 more effectively and hence increase the volume of the sub-muffler 1.

Further, in some cases, the front floor tunnel section 60 includes, for example, an inclined surface 67 inclined with respect to the road surface at a certain angle in the front/back direction of the sub-muffler 1 as shown in FIG. 31. In this case, the central part 20 of the sub-muffler 1 has a surface roughly conforming to the inclined surface 67. Therefore, it is possible to occupy the vacant space below the inclined surface 67 more effectively and hence increase the volume of the sub-muffler 1.

An increase in the total volume of the sub-muffler and the main muffler lowers the exhaust resistance of the engine and hence contributes to an improvement in the engine power and the fuel efficiency. However, there is a limit to the increase in the volume of the main muffler because of the restriction imposed by the vehicle design and a demand that the interior space should be increased as much as possible. Therefore, we have examined how the volume of the sub-muffler is increased in the first exemplary embodiment. It is difficult to ensure that there is a large space for mounting the sub-muffler because of other factors regarding the vehicle design and the design restriction of the unit to be mounted. Therefore, we have decided to effectively use the conventional housing space by changing the outer shape of the sub-muffler as explained above.

Further, we have conducted experiments for measuring primary sound pressure magnitudes of an exhaust sound with respect to volume ratios of the sub-muffler to the total volume of the sub-muffler and the main muffler. The primary sound pressure magnitude indicates the magnitude of a sound pressure of the exhaust sound. A decrease in the primary sound pressure magnitude means a decrease in the noise caused by the exhaust. As shown in FIG. 6, when the volume ratio is increased from 0.1 to 0.5, the primary sound pressure magnitude gradually decreases until it eventually reaches the minimum value. The volume of a typical sub-muffler is much smaller than that of a main muffler. That is, the volume ratio of a sub-muffler is about 0.2 at the maximum. It is possible to reduce the noise caused by the exhaust by employing the sub-muffler according to this exemplary embodiment and thereby increasing the volume ratio of the sub-muffler.

Manufacturing Method 1

Figure 7:
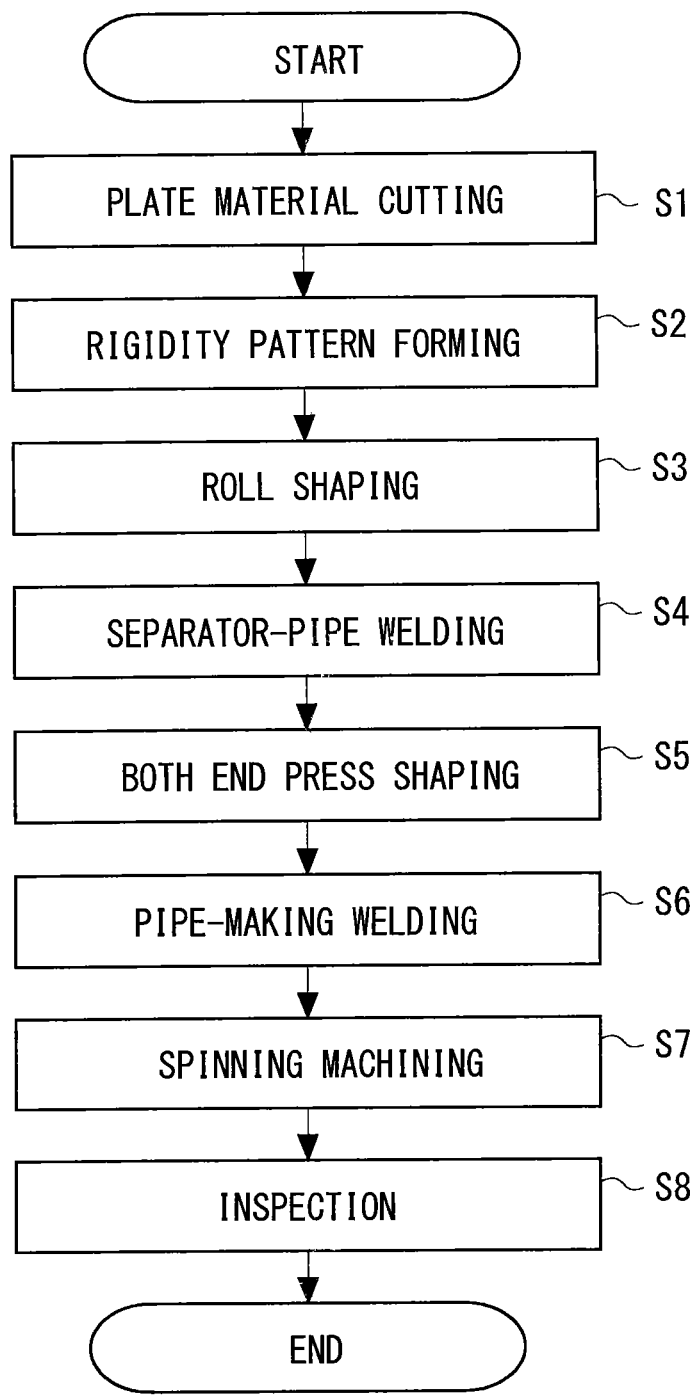
FIG. 7 is a flowchart showing Manufacturing Method 1.

Next, an example of a manufacturing method of a sub-muffler 1 according to the first exemplary embodiment is explained with reference to FIGS. 8 to 18 as well as FIG. 7. FIG. 7 is a flowchart showing Manufacturing Method 1. FIGS. 8 to 18 are figures showing steps in Manufacturing Method 1.

Figure 8:
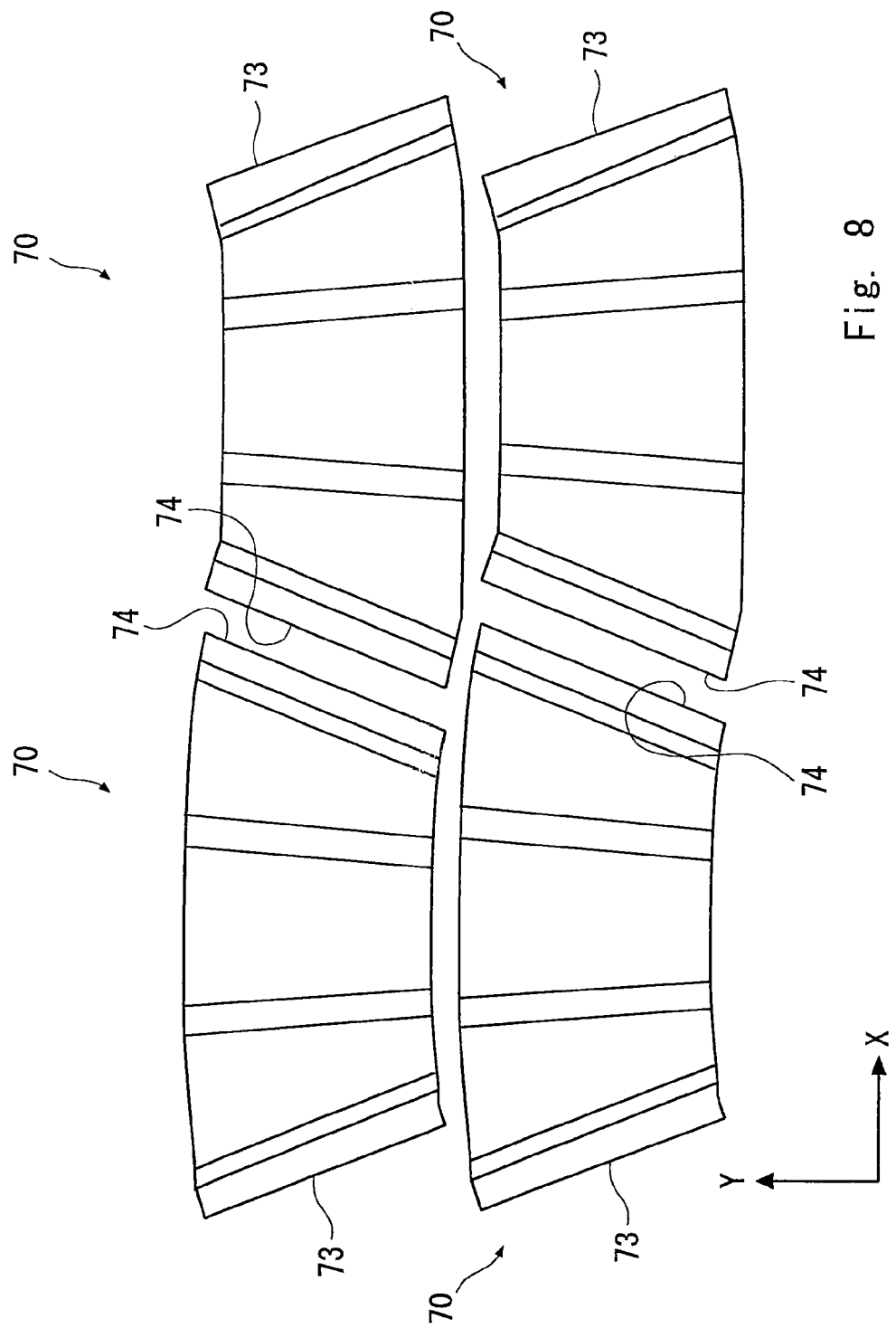
FIG. 8 is a schematic diagram showing one step in the Manufacturing Method 1.

As shown in FIG. 8, for example, plate materials 70 having a predetermined trapezoidal shape are cut out from a plate made of the same type of material as that of the tubular body 2 (plate material cutting step S1). FIG. 8 shows an example where four plate materials 70 having identical shapes are cut out by punching or the like. Each plate material 70 has edges 73 and 74. These edges 73 and 74 are parts corresponding to a pair of opposite sides extending between the top side and the bottom side in the trapezoidal shape.

Figure 9:
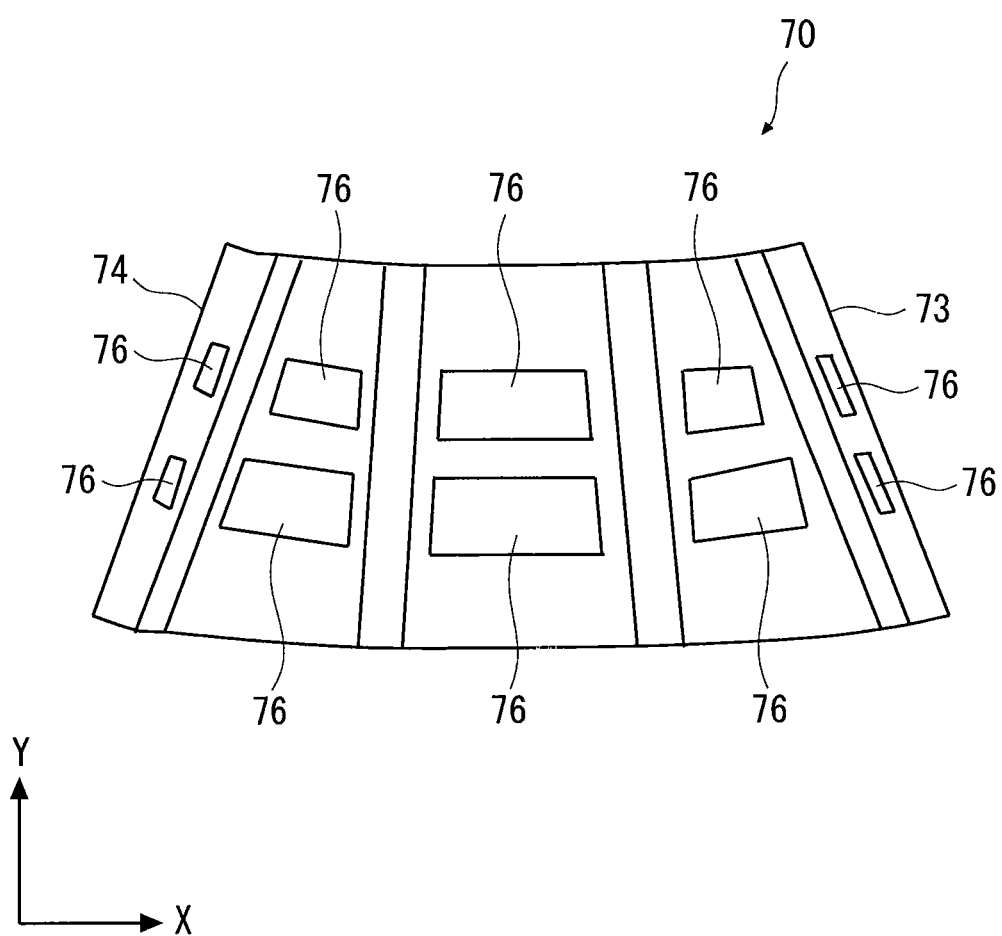
FIG. 9 is a schematic diagram showing one step in the Manufacturing Method 1.
Figure 10:
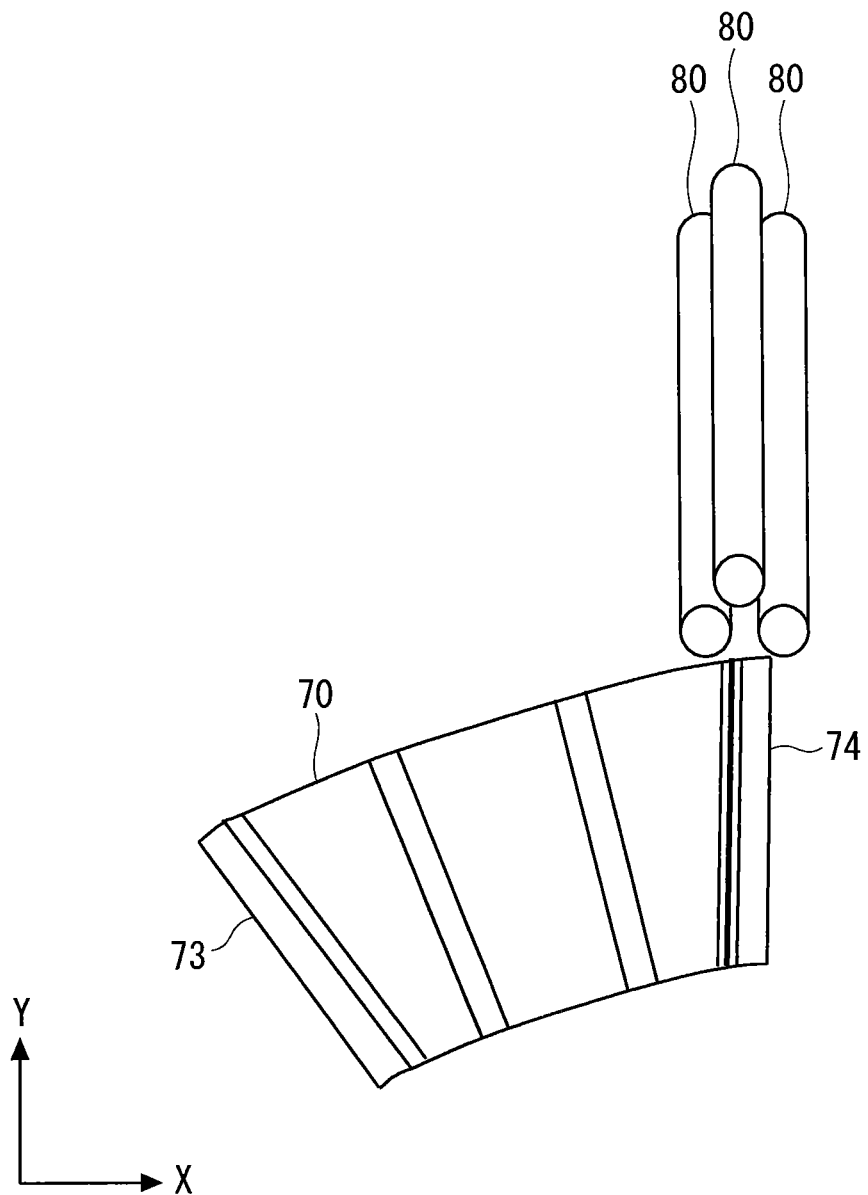
FIG. 10 is a schematic diagram showing one step in the Manufacturing Method 1.

Next, as shown in FIG. 9, for example, a bump-and-recess pattern 76 is formed by using a press die (not shown) in order to increase the rigidity (rigidity pattern shaping step S2). Note that for the sake of easier understanding, the illustration of the bump-and-recess pattern 76 is omitted in FIGS. 1 to 8 and FIGS. 10 to 30.

Next, as shown in FIGS. 10 to 14, the cut-out plate material 70 is made to pass between a plurality of rollers 80 (three rollers in the figure) and hence the plate material 70 is bent by using the rollers 80. By doing so, the plate material 70 is shaped into a tubular plate 72 (roll shaping step S3). The roll shaping step S3 may also be referred to as "rectangular tubular body shaping step".

Figure 11:
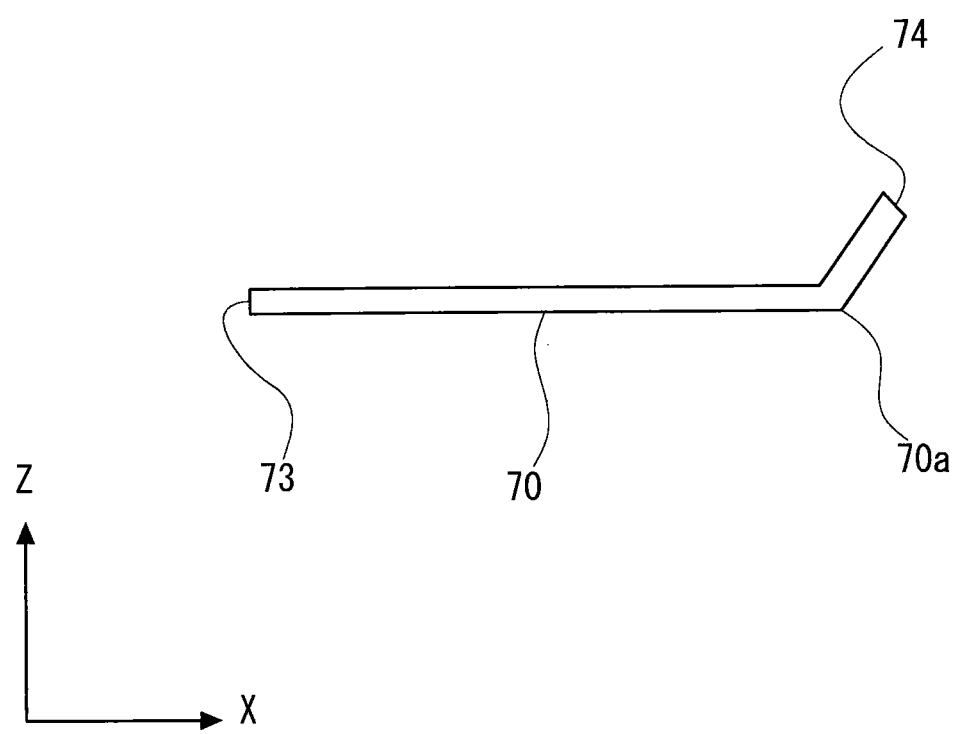
FIG. 11 is a schematic diagram showing one step in the Manufacturing Method 1.
Figure 12:
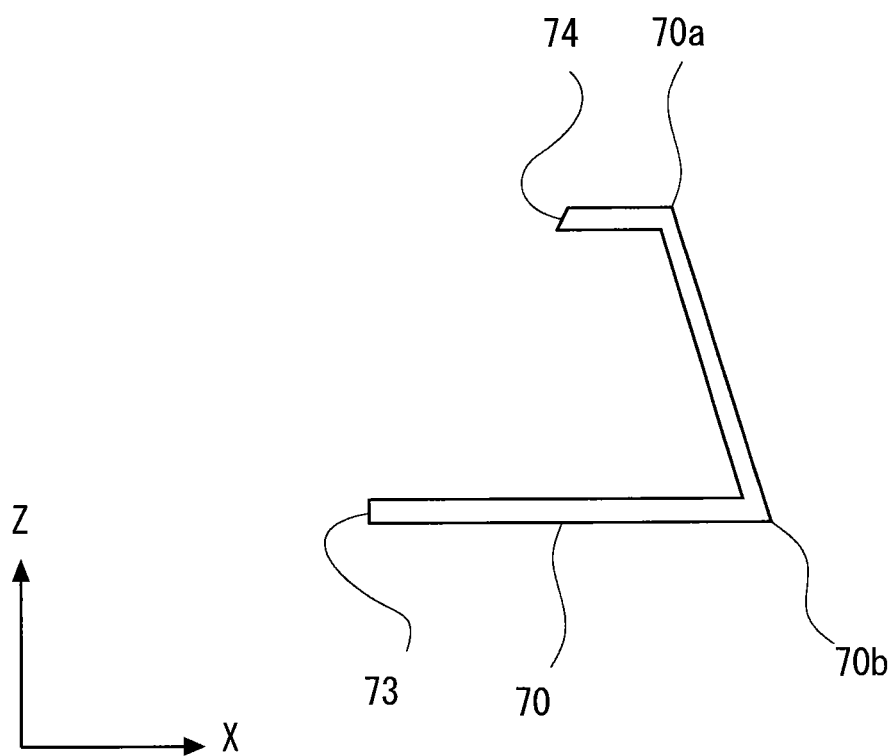
FIG. 12 is a schematic diagram showing one step in the Manufacturing Method 1.
Figure 13:
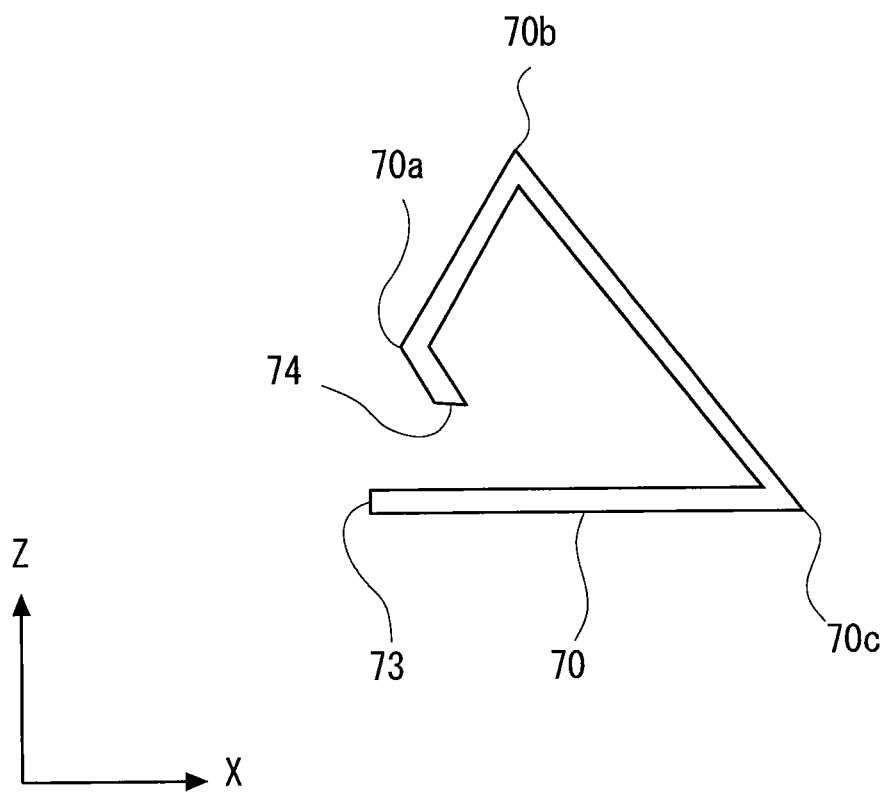
FIG. 13 is a schematic diagram showing one step in the Manufacturing Method 1.
Figure 14:
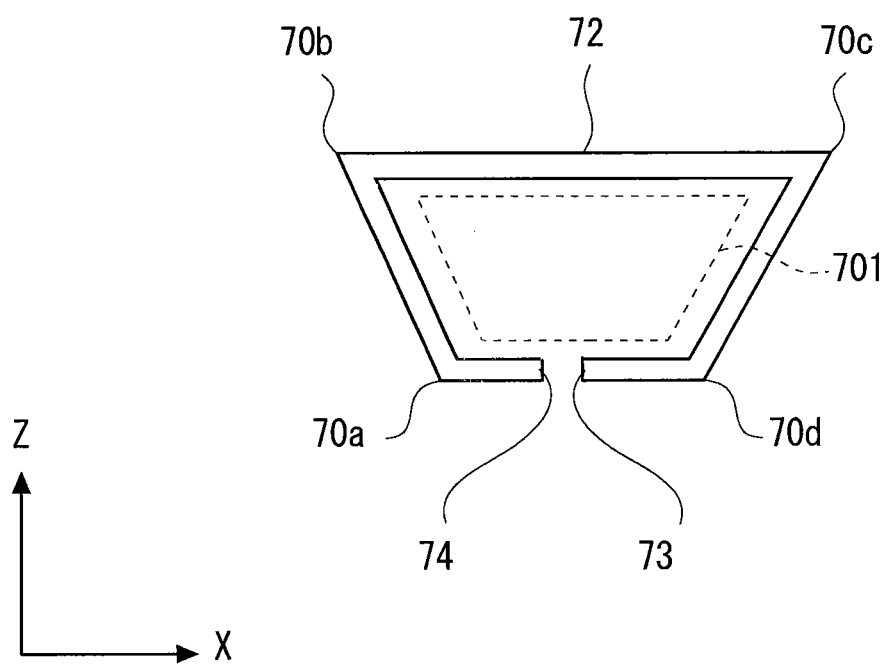
FIG. 14 is a schematic diagram showing one step in the Manufacturing Method 1.

In particular, the plate material 70 is bent at a place 70a near its end as shown in FIG. 11. Next, as shown in FIG. 12, the plate material 70 is bent at a place 70b that is closer to the edge 73 than the place 70a is. Further, similarly, the plate material 70 is bent at a place 70c that is closer to the edge 73 than the place 70b is as shown in FIG. 13. Finally, the plate material 70 is bent at a place 70d that is closer to the edge 73 than the place 70c is as shown in FIG. 14. As a result, the plate material 70 is shaped into a tubular plate 72 having a trapezoidal shape in cross section. The end face at the edge 73 is opposed to the end face of the edge 74. Note that the end faces of the edges 73 and 74 may be brought into contact with each other. The inner space of the tubular plate 72 serves as a base space of an expansion chamber having a predetermined volume in the sub-muffler. Further, the outer shape of the plate material 70 (which may also be referred to as "rectangular tubular body"), which are bent so that its cross-sectional shape becomes a trapezoidal shape, serves as a base shape of the outer shape of the tubular body 2 of the formed sub-muffler. This shape conforms to the shape of the wall surface forming the floor tunnel, which is recessed toward the vehicle interior and has a trapezoidal shape in cross section.

Figure 15:
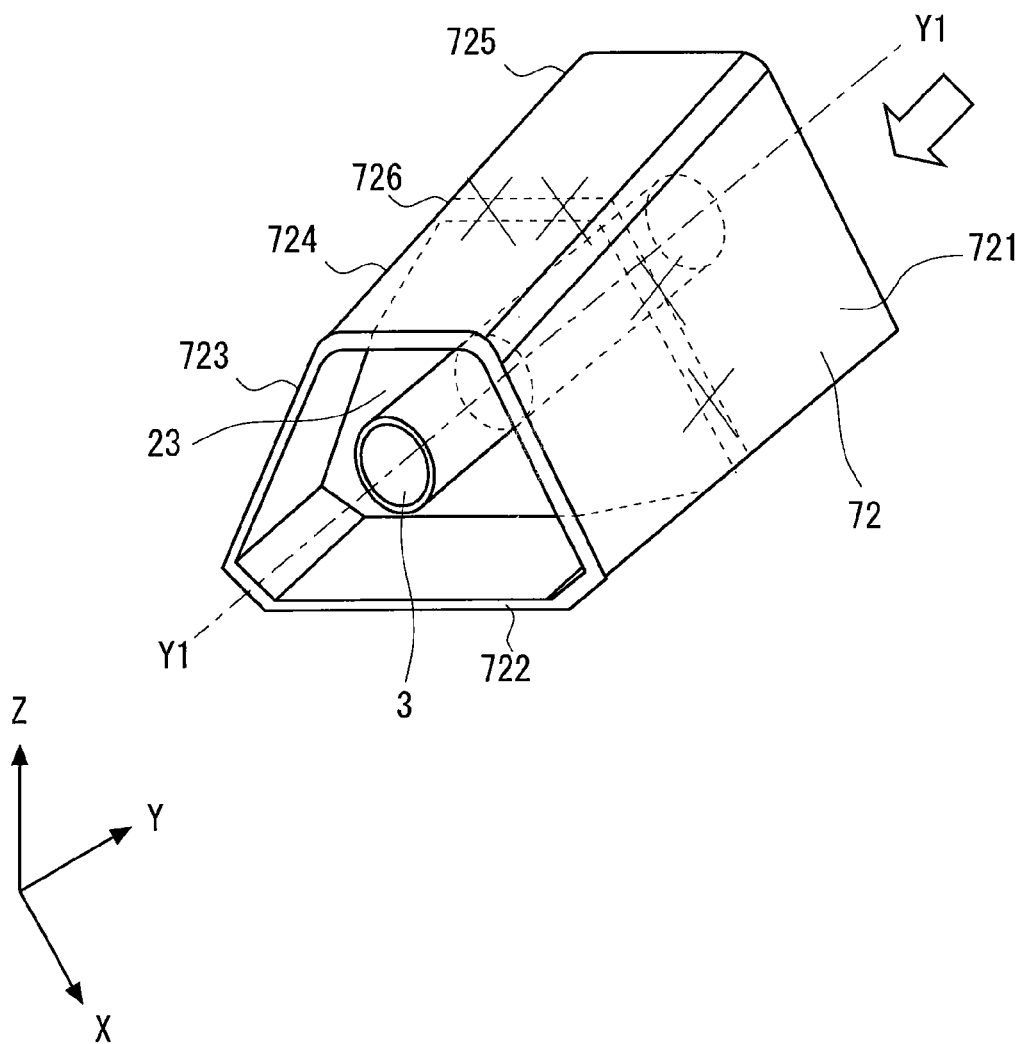
FIG. 15 is a schematic diagram showing one step in the Manufacturing Method 1.

Next, as shown in FIGS. 14 and 15, a flow path pipe 3 and a separator 23, which are formed in advance, are inserted into a space 701 of the tubular plate 72, and the separator 23 is welded to a central part 726 of the tubular plate 72 (separator-pipe welding step S4). Note that the corners of the tubular plate 72, at which the plate material 70 are bent, may be rounded to some extent, or may be further deformed to some extent so that the tubular plate 72 becomes an octagonal prism.

Figure 16:
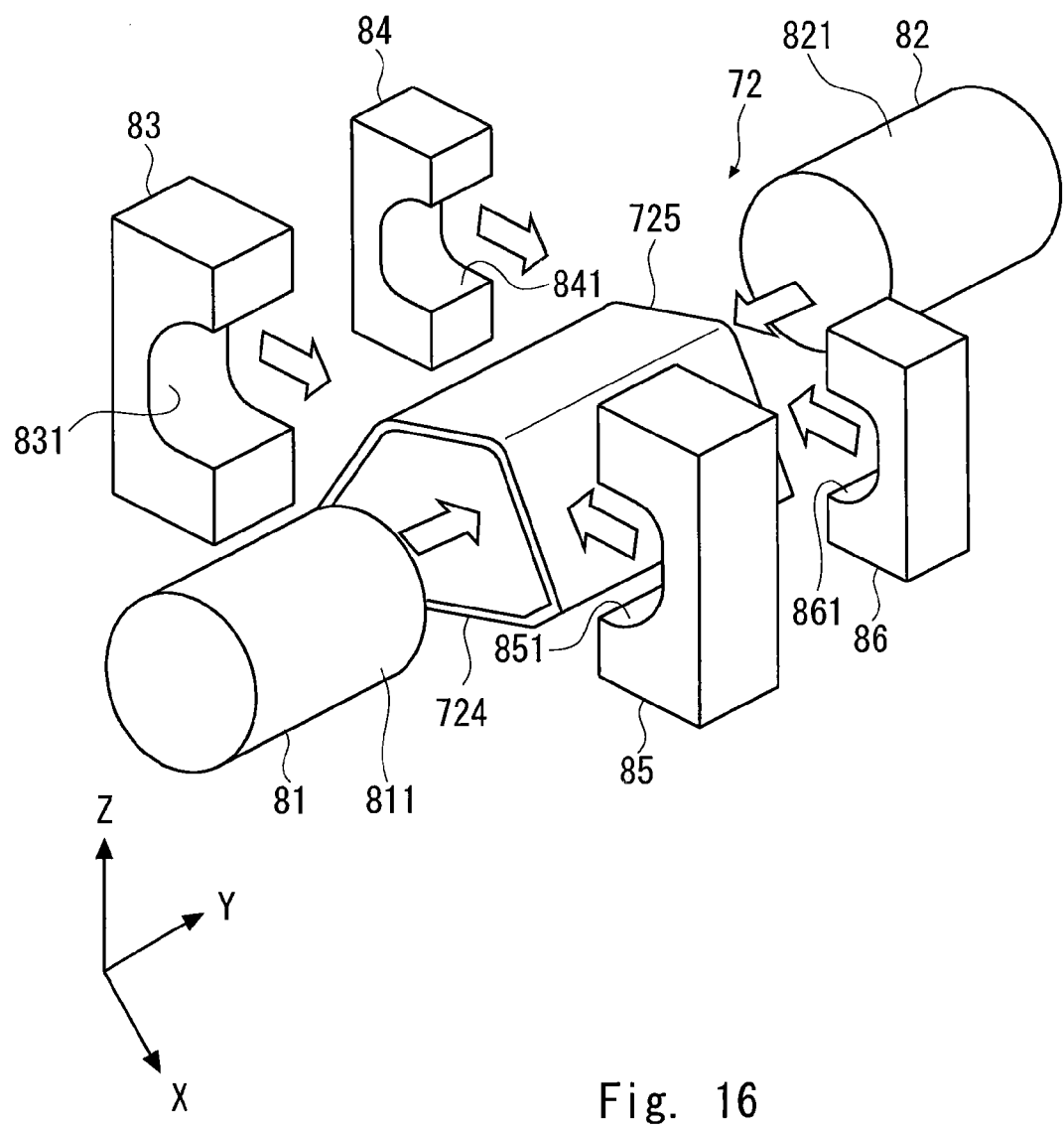
FIG. 16 is a schematic diagram showing one step in the Manufacturing Method 1.

Next, as shown in FIG. 16, both ends 724 and 725 of the tubular plate 72 are press-shaped by using inner press dies 81 and 82 and outer press die 83, 84, 85 and 86 (both end press shaping step S5) so that the cross-sectional shapes of the ends 724 and 725 become circular shapes. The both end press shaping step S5 may also be referred to as "preliminary shaping step". Note that for the sake of easier understanding, the illustration of the flow path pipe 3 and the separator 23 are omitted in FIGS. 16 and 17. The above-described step is a preliminary shaping step that is performed so that a spinning machining step S7, which is performed later, can be successfully performed.

Each of the inner press dies 81 and 82 has a cylindrical shape. Further, the inner press dies 81 and 82 have shaping surfaces 811 and 821, respectively, in the form of cylindrical outer wall surfaces. Each of the outer press dies 83, 84, 85 and 86 is, for example, a rectangular parallelepiped. Further, the outer press dies 83, 84, 85 and 86 have shaping surfaces 831, 841, 851 and 816, respectively, having arc-like concave curved surfaces. By disposing the outer press dies 83 and 85 so that the shaping surfaces 831 and 851 are opposed with each other and aligned with the end part 724 with the end part 724 interposed therebetween, and then abutting the outer press dies 83 and 85 on each other, a shaping surface in the form of a cylindrical inner wall surface is formed. Similarly, by disposing the outer press dies 84 and 86 so that the shaping surfaces 841 and 861 are opposed with each other and then abutting the outer press dies 84 and 86 on each other, a shaping surface in the form of a cylindrical inner wall surface is formed.

In particular, firstly, the tubular plate 72 is fixed in a predetermined place in a predetermined posture and the inner press die 81 is inserted into the end part 724 of the tubular plate 72. Next, the press dies 83 and 85 are disposed across the end part 724 and a compressing force is applied to the end part 724 by the outer press dies 83 and 85. As a result, the end part 724 is shaped so that its cross-sectional shape becomes a circular shape. For the end part 725, a procedure similar to the above-described procedure is carried out.

Figure 17:
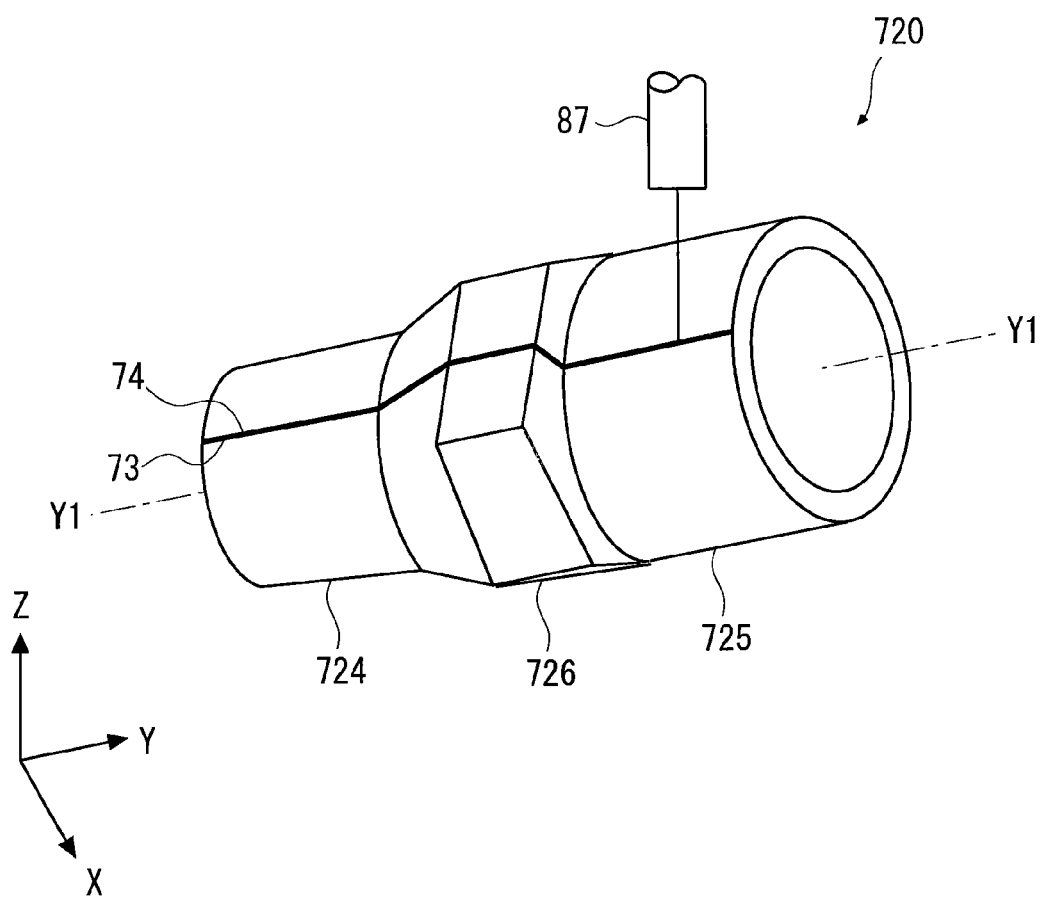
FIG. 17 is a schematic diagram showing one step in the Manufacturing Method 1.

Next, as shown in FIG. 17, the edges 73 and 74 of the tubular plate 72 are welded to each other by using a welding torch 87 connected to a welding device (not shown) (pipe-making welding step S6). As a result, a perfect pipe 720 is formed.

Figure 18:
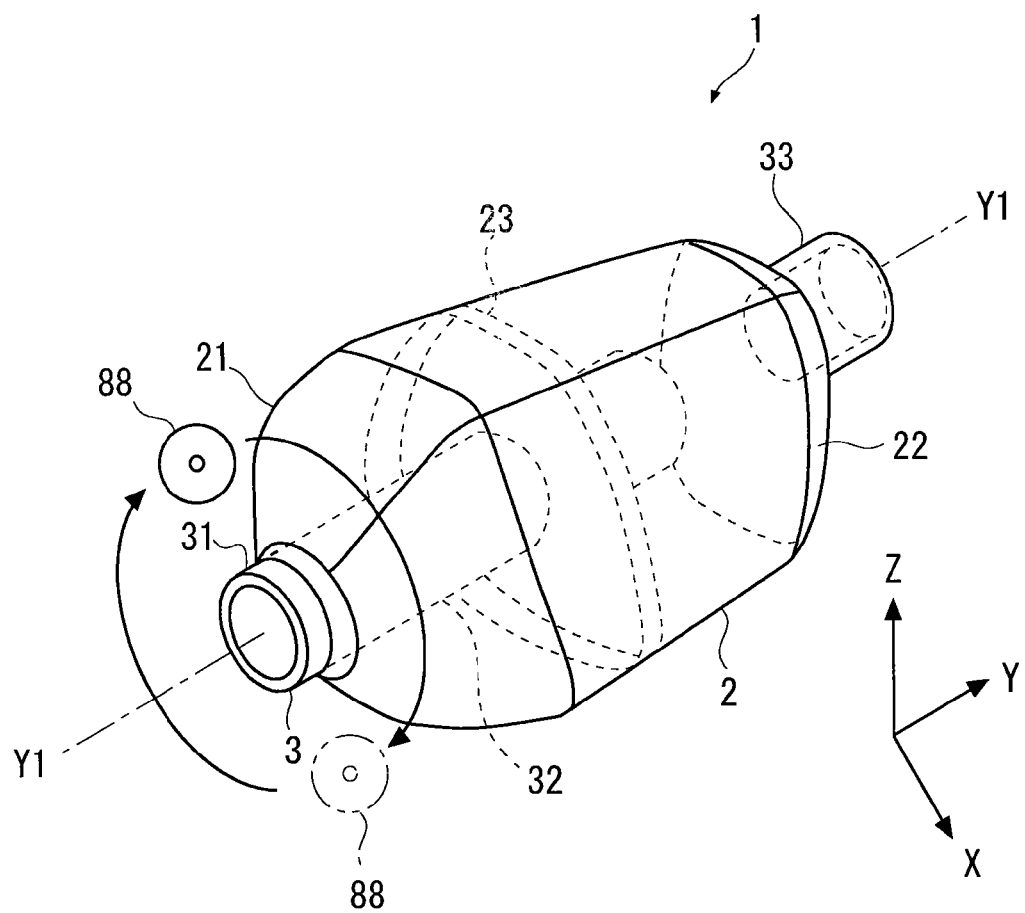
FIG. 18 is a schematic diagram showing one step in the Manufacturing Method 1.

Next, as shown in FIGS. 17 and 18, a spinning machining is performed by using a form-shaping rotating roller 88 that can rotate (rotation and revolution) and is included in a spinning machining device (not shown). In particular, in the spinning machining, the rotating roller 88 is rotated on its own axis and revolved around the end part 724 of the pipe 720 while pressing the rotating roller 88 onto the end part 724 so that the cross-sectional shape of the end part 724 becomes gradually smaller (spinning machining step S7). The spinning machining step S7 may also be referred to as "diameter reduction shaping step". The revolution trajectory of the rotating roller 88 does not necessarily have to be a perfect circle. As shown in FIG. 18, the revolution trajectory may be a rectangular trajectory so that four bending lines are formed in the end part 21. Since the end part 724 has a circular shape when the spinning machining is performed, the shaping of the end part 724 by using the rotating roller 88 can be easily carried out. By gradually reducing the revolution diameter of the rotating roller 88, the cross-sectional shape of the end part 724 becomes gradually smaller as the distance to the flow path pipe 3 decreases.

For the spinning machining for the end part 725, a procedure similar to the above-described procedure is carried out.

Finally, if necessary, an inspection for certain items is carried out (inspection step S8) after the spinning machining step S7. Examples of such inspection items include welding quality and size tolerances.

The sub-muffler 1 is obtained through the above-described steps.

As described above, according to the above-described Manufacturing Method 1, it is possible to manufacture a rectangular tubular sub-muffler including a central part having a rectangular shape in cross section by bending one plate material and thereby forming a rectangular tubular body, performing a preliminarily shaping through which the end parts of the rectangular tubular body are shaped into circular shapes in cross section, and then performing a form-shaping process through which the diameters of both ends are reduced by a spinning machining while preventing or reducing the occurrences of wrinkling and cracking.

Further, according to the above-described Manufacturing Method 1, a tubular body of a sub-muffler can be manufactured from one plate material and the manufactured tubular body of the sub-muffler can be directly connected to a pipe(s). That is, there is no need to separately manufacture a separate connection component(s) in addition to the tubular body of the sub-muffler, thus making it possible to manufacture sub-mufflers with a high yield rate.

Manufacturing Method 2

Figure 19:
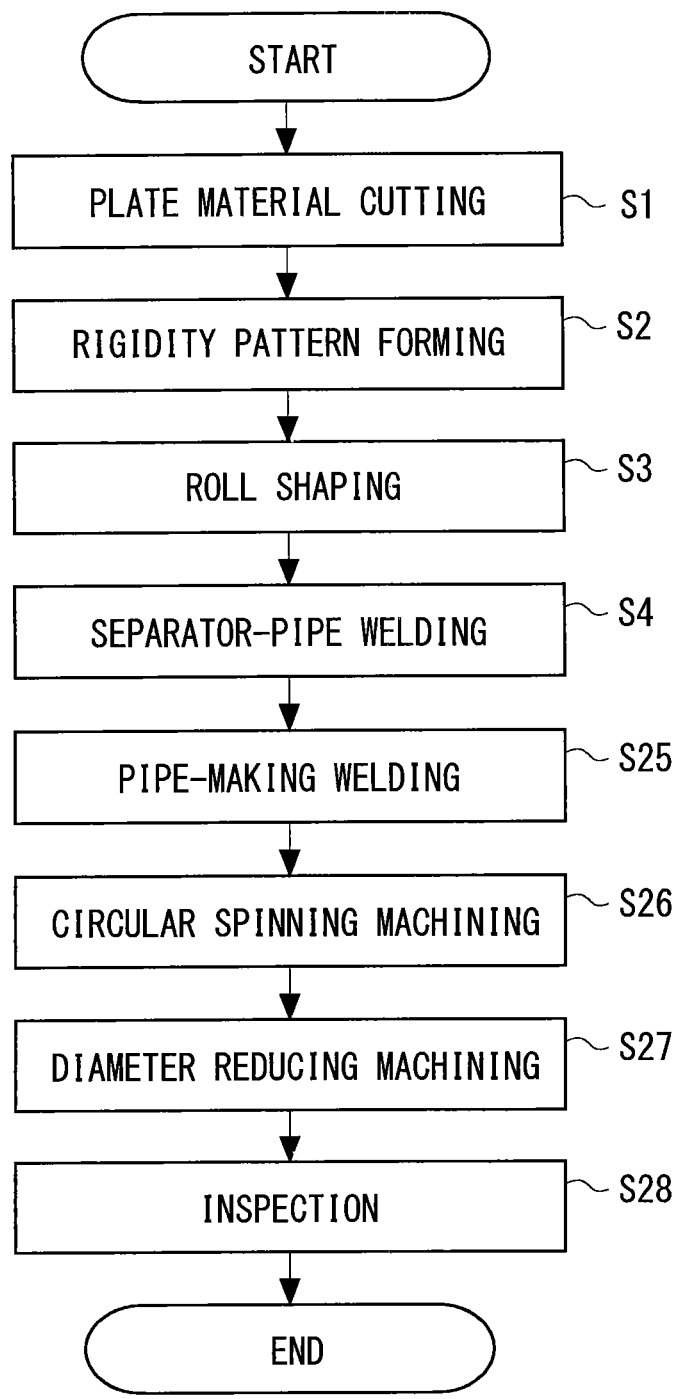
FIG. 19 is a flowchart showing Manufacturing Method 2.

Next, another example of a manufacturing method of a sub-muffler 1 according to the first exemplary embodiment is explained with reference to FIGS. 20 to 27 as well as FIG. 19. FIG. 19 is a flowchart showing Manufacturing Method 2. FIGS. 20 to 27 are figures showing steps in Manufacturing Method 2.

Firstly, similarly to Manufacturing Method 1, the plate material cutting step S1 to the separator-pipe welding step S4 are performed.

Figure 20:
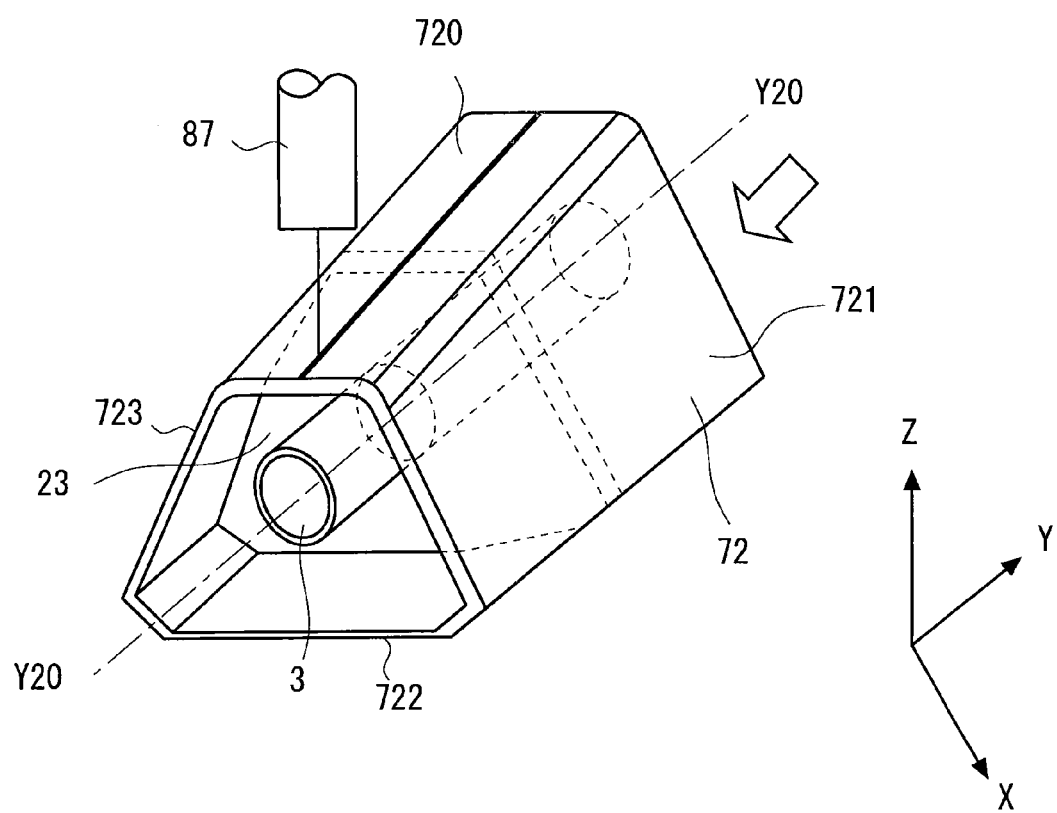
FIG. 20 is a schematic diagram showing one step in the Manufacturing Method 2.

Next, as shown in FIG. 20, the edges 73 and 74 (see FIG. 14) of the tubular plate 72 are welded to each other by using a welding torch 87 connected to a welding device (not shown) (pipe-making welding step S25). As a result, a perfect pipe 720 is formed. The pipe 720 has a central axis Y20.

Figure 21:
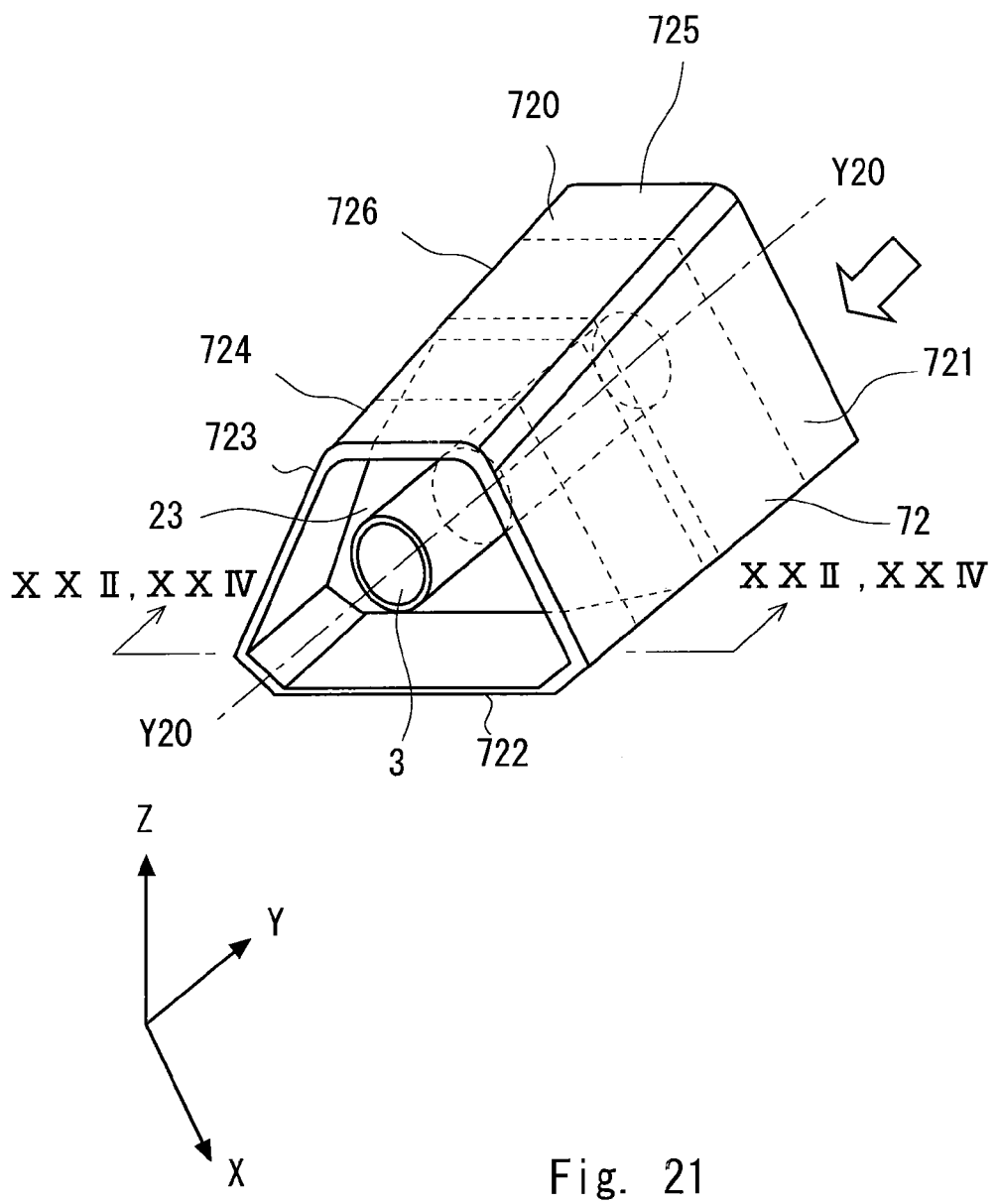
FIG. 21 is a schematic diagram showing one step in the Manufacturing Method 2.
Figure 22:
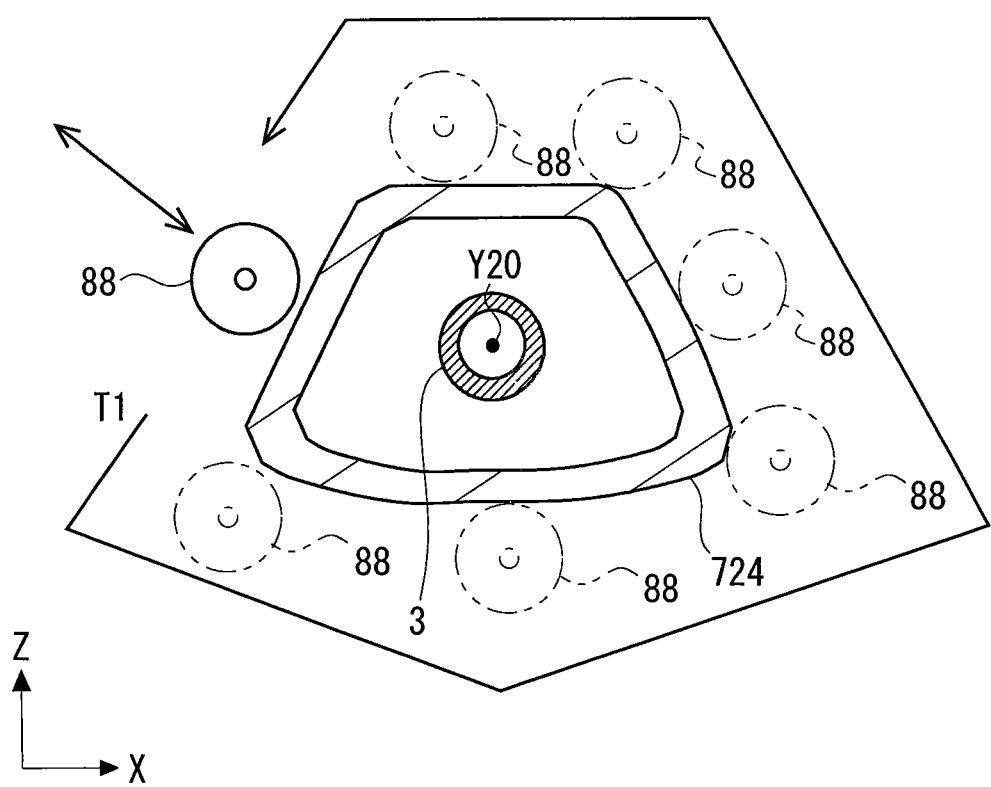
FIG. 22 is a schematic diagram showing one step in the Manufacturing Method 2.

Next, as shown in FIGS. 21 and 22, a spinning machining is performed by using a form-shaping rotating roller 88 that can rotate (rotation and revolution) and is included in a spinning machining device (not shown). In particular, in the spinning machining, the rotating roller 88 is rotated on its own axis and revolved around the end part 724 of the pipe 720 while pressing the rotating roller 88 onto the end part 724 so that the cross-sectional shape of the end part 724 becomes smaller (circular spinning machining step S26). The circular spinning machining step S26 may also be referred to as "preliminary shaping step". The above-described step is a preliminary shaping step that is performed so that a diameter reduction spinning machining step S27, which is performed next, can be successfully performed.

Figure 23:
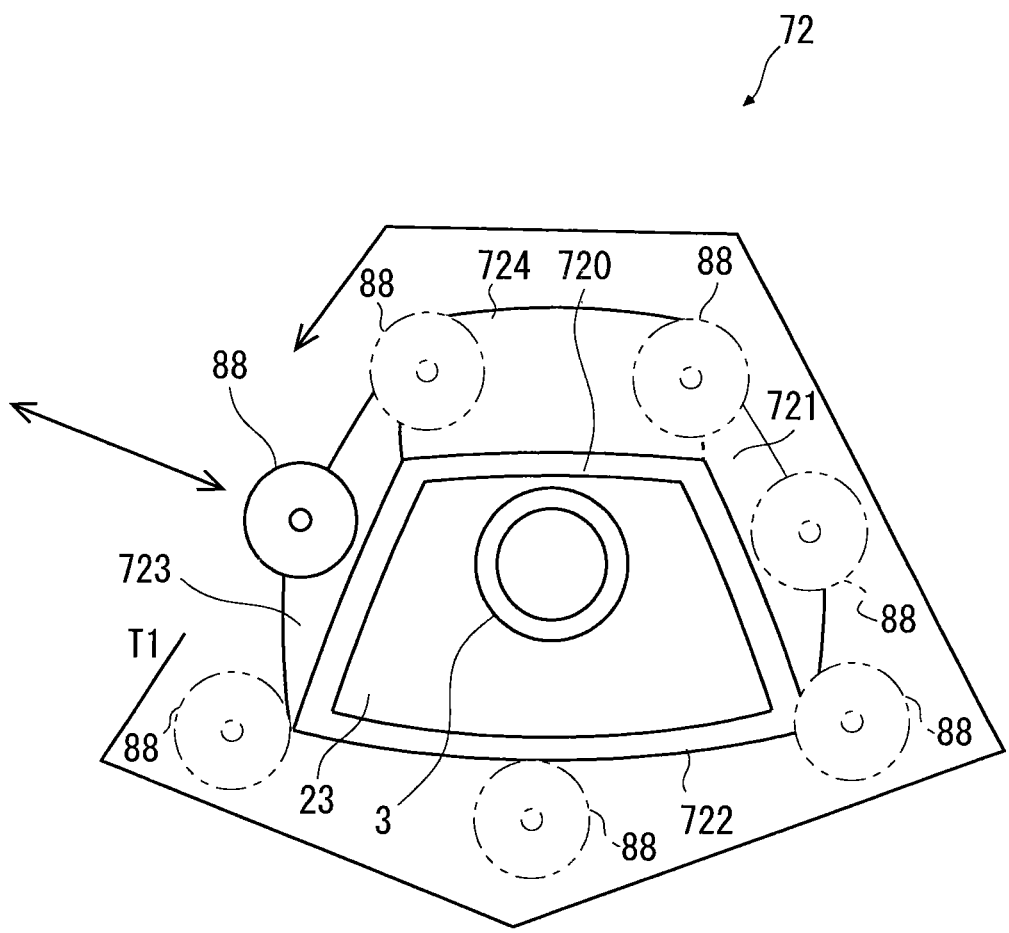
FIG. 23 is a schematic diagram showing one step in the Manufacturing Method 2.
Figure 24:
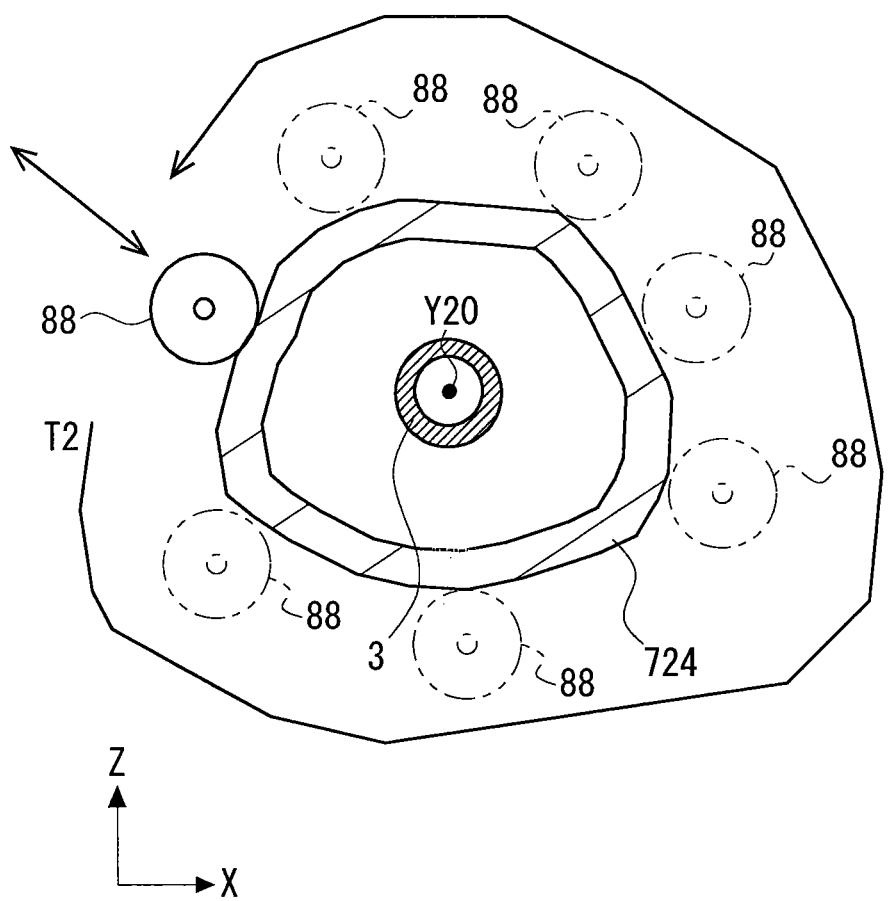
FIG. 24 is a schematic diagram showing one step in the Manufacturing Method 2.

In particular, as shown in FIGS. 22 and 23, firstly, a spinning machining is performed by rotating the rotating roller 88 on its own axis and moving the rotating roller 88 along a rectangular trajectory T1 while pressing the rotating roller 88 onto the end part 724 of the tubular body 720. Note that the rectangular trajectory T1 is a rectangular trajectory on the imaginary plane ZX.

Next, as shown in FIGS. 22 to 25, the spinning machining is performed while gradually changing the trajectory of the rotating roller 88 from the rectangular trajectory T1 to an intermediate trajectory T2, and to a circular trajectory T3. The trajectory T2 is, for example, a rectangular trajectory on the imaginary plane ZX that is somewhat rounded compared to the rectangular trajectory T1. The circular trajectory T3 is, for example, a circular trajectory around the central axis Y20 on the imaginary plane ZX. By performing the above-described spinning machining, the end part 724 is machined so that its cross-sectional shape becomes a circular shape.

For the spinning machining for the end part 725, a procedure similar to the above-described procedure is carried out.

Figure 25:
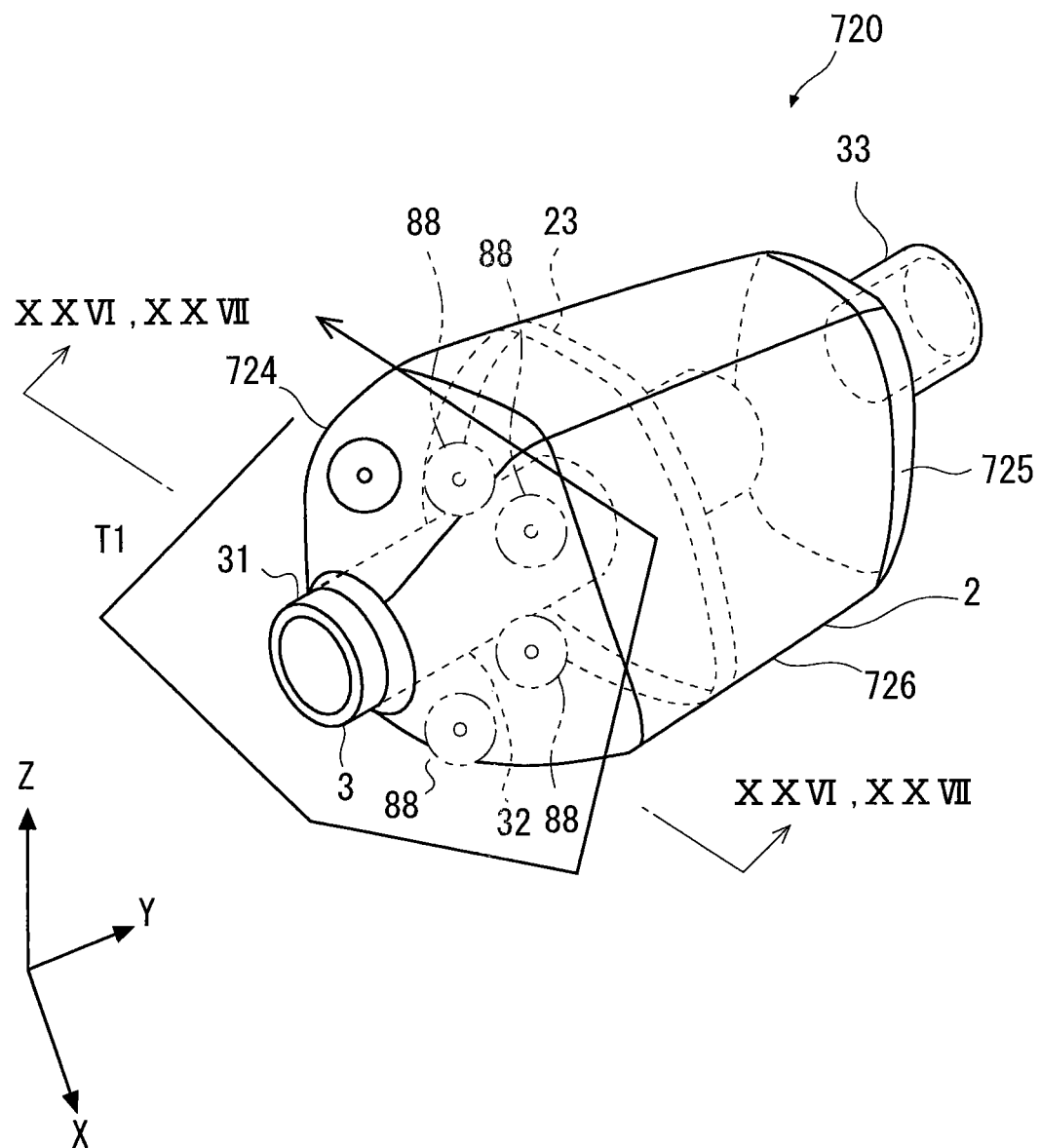
FIG. 25 is a schematic diagram showing one step in the Manufacturing Method 2.
Figure 26:
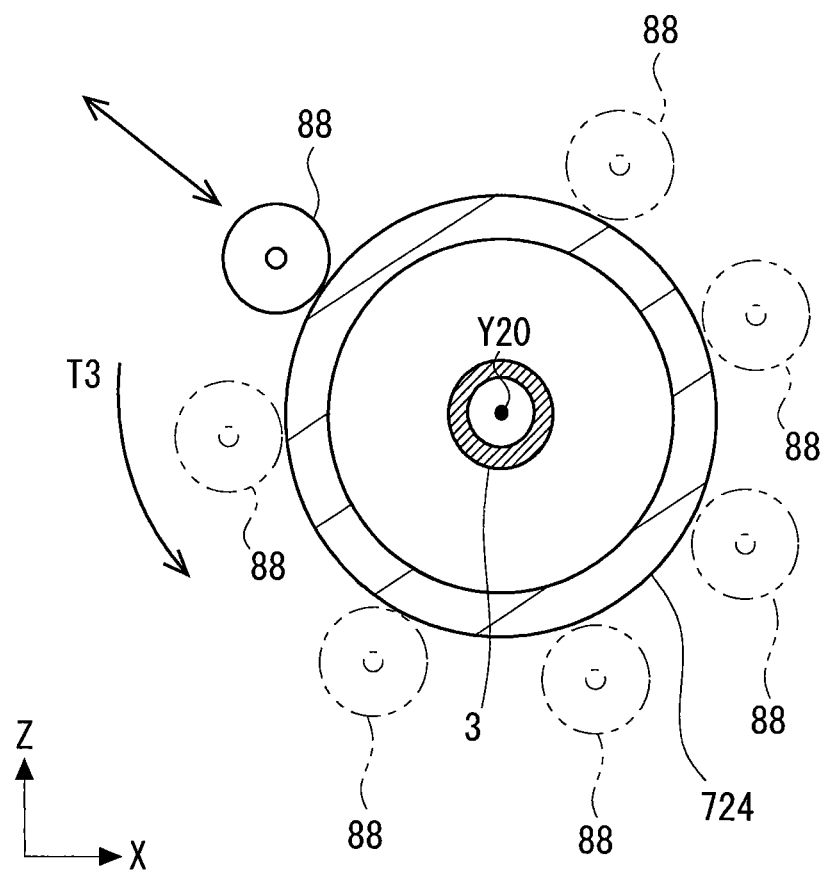
FIG. 26 is a schematic diagram showing one step in the Manufacturing Method 2.
Figure 27:
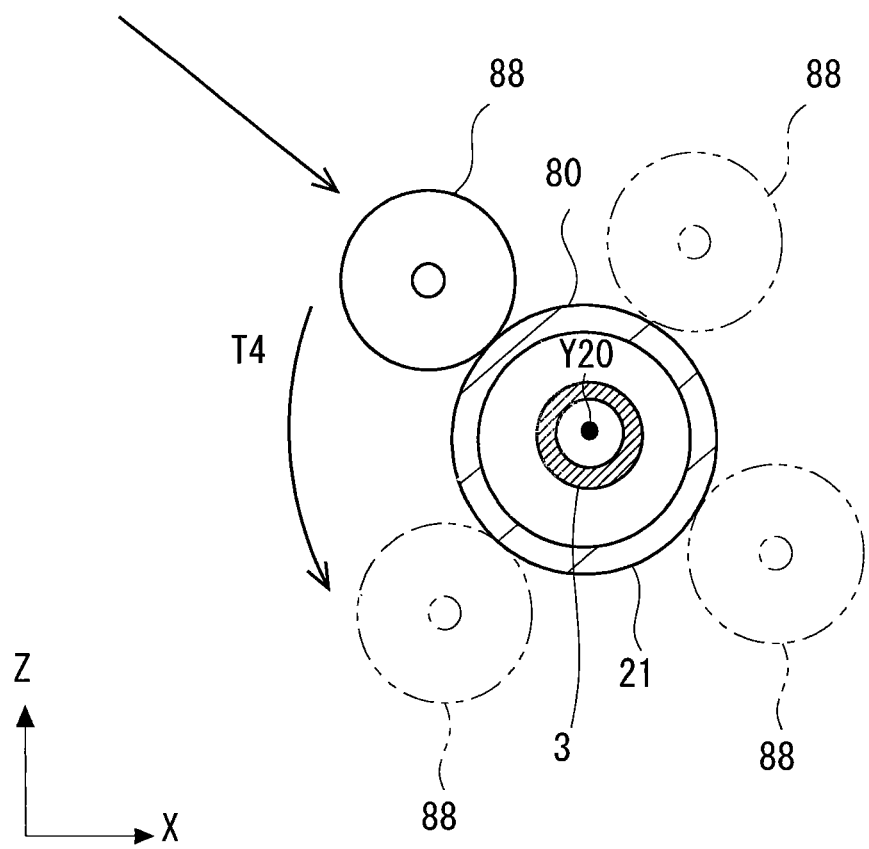
FIG. 27 is a schematic diagram showing one step in the Manufacturing Method 2.

Next, as shown in FIGS. 25 and 27, the diameter of the end part 724 is reduced by further performing a spinning machining for the end part 724 (diameter reduction spinning machining step S27) and an end part 21 is thereby formed. The diameter reduction spinning machining step S27 may also be referred to as "diameter reduction shaping step". The revolution trajectory of the rotating roller 88 does not necessarily have to be a perfect circle. As shown in FIG. 25, the revolution trajectory may be a rectangular trajectory so that four bending lines are formed in the end part 724. Since the end part 724 has a circular shape when the spinning machining is performed, the shaping of the end part 724 by using the rotating roller 88 can be easily carried out. By gradually reducing the revolution diameter of the rotating roller 88, the cross-sectional shape of the end part 724 becomes gradually smaller as the distance to the flow path pipe 3 decreases.

For the spinning machining for the end part 725, a procedure similar to the above-described procedure is carried out. Here, a tubular body 2 can be obtained. The circular spinning machining step S26 and the diameter reduction spinning machining step S27 may be performed by using the same spinning machining device.

Finally, similarly to Manufacturing Method 1, if necessary, an inspection step S8 is performed (inspection step S8).

The sub-muffler 1 is obtained through the above-described steps.

As described above, according to the above-described Manufacturing Method 2, it is possible to manufacture a rectangular tubular sub-muffler including a central part having a rectangular shape in cross section by bending one plate material and thereby forming a rectangular tubular body, performing a preliminarily shaping through which the end parts of the rectangular tubular body are shaped into circular shapes in cross section, and then performing a form-shaping process through which the diameters of both ends are reduced by a spinning machining while preventing or reducing the occurrences of wrinkling and cracking as in the case of Manufacturing Method 1.

Further, according to the above-described Manufacturing Method 2, a tubular body of a sub-muffler can be manufactured from one plate material and the manufactured tubular body of the sub-muffler can be directly connected to a pipe(s) as in the case of Manufacturing Method 1. That is, there is no need to separately manufacture a separate connection component(s) in addition to the tubular body of the sub-muffler, thus making it possible to manufacture a tubular body of a sub-muffler from one plate material. Therefore, sub-mufflers can be manufactured with a high yield rate.

Further, according to the above-described Manufacturing Method 2, the circular spinning machining step and the diameter reduction spinning machining step can be performed by using the same spinning machining device. That is, sub-mufflers can be manufactured while reducing the device cost.

Second Exemplary Embodiment

Figure 29:
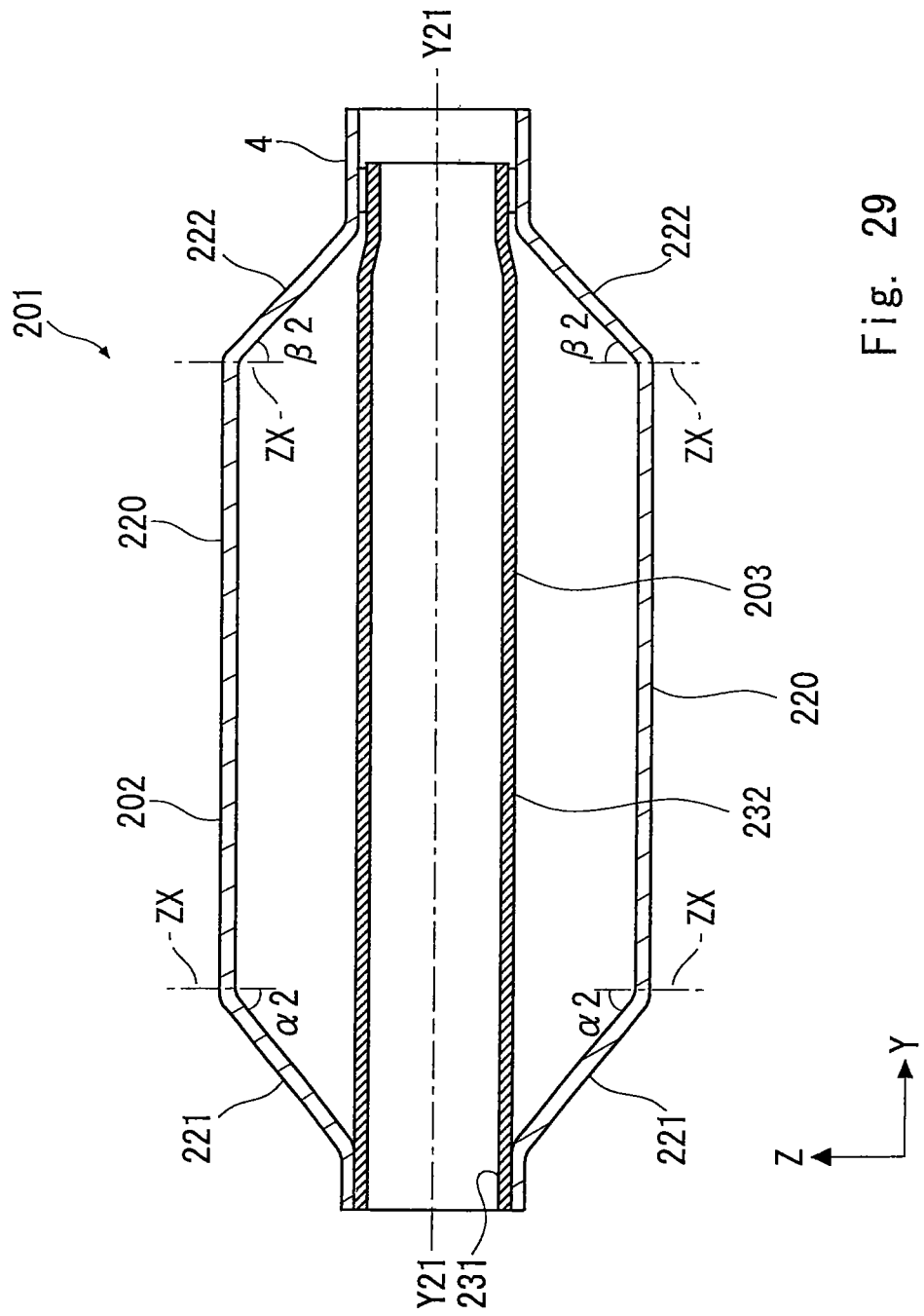
FIG. 29 is a cross section of the sub-muffler according to the second exemplary embodiment.
Figure 30:
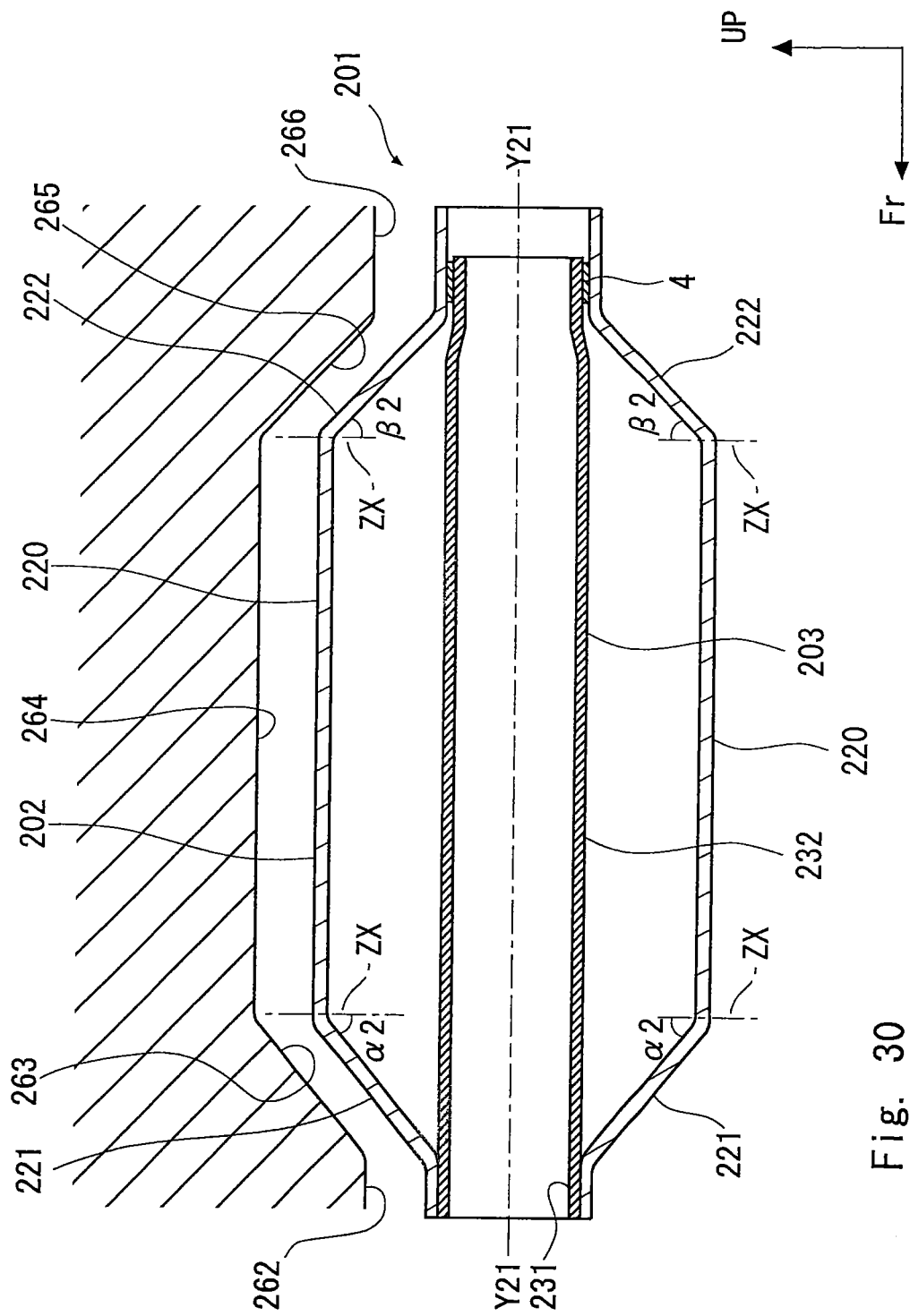
FIG. 30 is a cross section of the sub-muffler and a front floor tunnel section according to the second exemplary embodiment.
Figure 32:
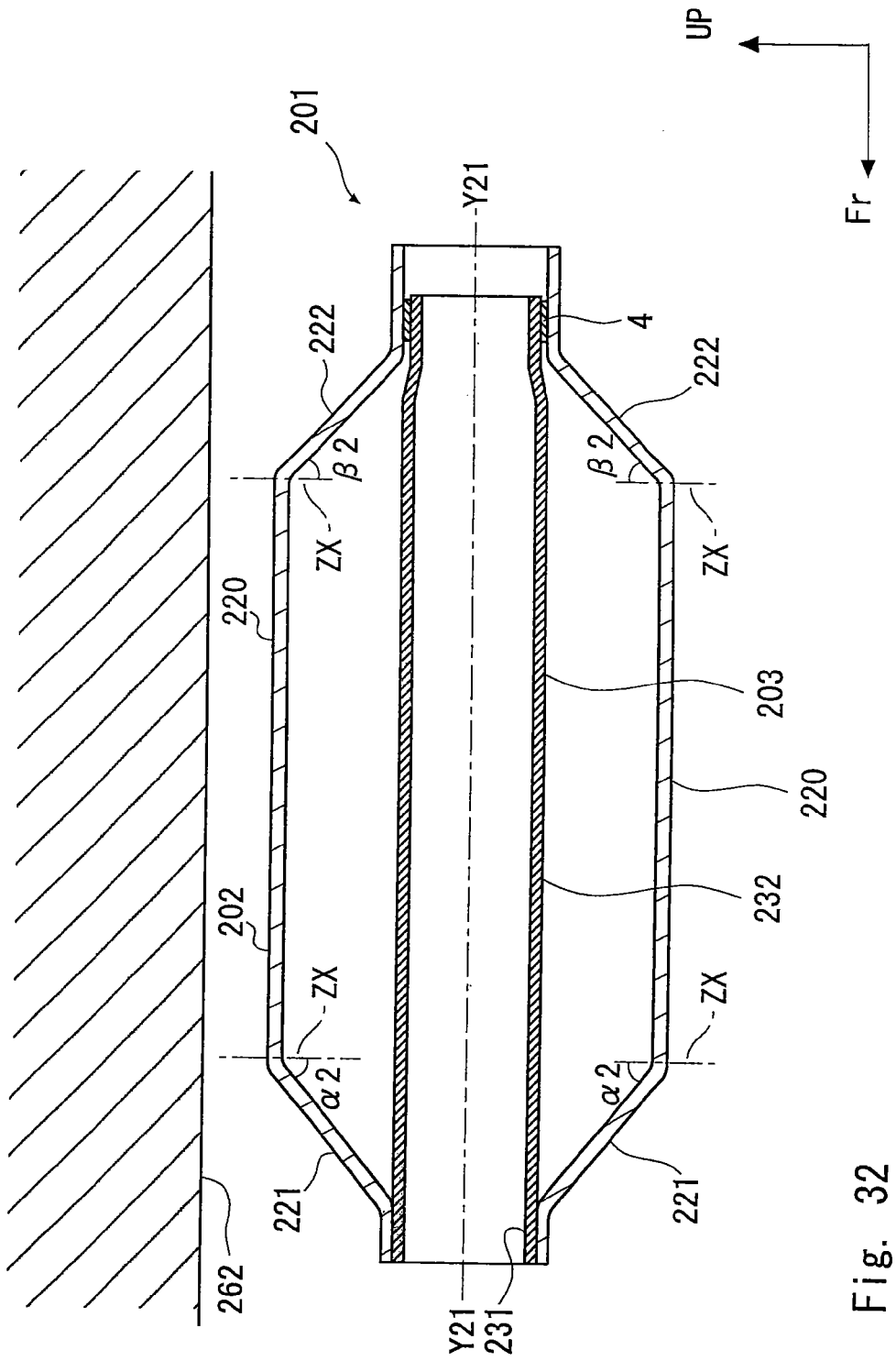
FIG. 32 is a cross section of a sub-muffler and a front floor tunnel section.

Next, a sub-muffler according to a second exemplary embodiment is explained with reference to FIGS. 28-30 and 32. FIG. 28 is a perspective view of a sub-muffler. FIG. 29 is a cross section near a Y21-Y21 axis of the sub-muffler. FIGS. 30 and 32 are cross sections of the sub-muffler and a front floor tunnel section. In contrast to the sub-muffler 1 according to the first exemplary embodiment, the sub-muffler according to the second exemplary embodiment includes no separator and includes a tubular body whose cross-sectional shape is unchanged over its length in the longitudinal direction.

As shown in FIG. 28, a sub-muffler 201 includes a tubular body 202, and a flow path pipe 203 (which may also be referred to as "inflow pipe" or "discharging pipe"). Further, the sub-muffler 201 is an example of an inner-pipe type sub-muffler including a flow path tube 203 inside thereof.

The tubular body 202 has a roughly trapezoidal shape in cross section. The tubular body 202 is made of, for example, a metal material such as iron, titanium, aluminum, or an alloy thereof. Examples of the alloy include stainless steel. The flow path pipe 203 is inserted into the tubular body 202. The flow path pipe 203 has a central axis Y21. The central axis Y21 may pass through the center of gravity in the cross section of the tubular body 202. The tubular body 202 includes a central part 220 (which may also be referred to as "main body"), an end part 221 (which may also be referred to as "first end part") extending in one direction from the central part 220, and an end part 222 (which may also be referred to as "second end part") extending in the other direction.

The central part 220 has a roughly trapezoidal shape in cross section, and its cross section is unchanged from the end part 21 to the end part 22. The central part 220 has a space inside thereof and this space functions as an expansion chamber. The inner diameter of the central part 220 is larger than the outer diameter of the flow path pipe 203. Further, the inner diameter of the parts of the ends parts 221 and 222 that are located closest to their ends is equal to or slightly larger than the outer diameter of the flow path pipe 203. The outer wall surface of the central part 220 is in parallel with the central axis Y21. In some cases, a bump-and-recess pattern (not shown) may be formed on the outer wall surface of the tubular body 202 in order to increase its rigidity.

As shown in FIG. 29, the diameters of the end parts 221 and 222 of the tubular body 202 are reduced so that they are closely attached to the outer circumferential surface of the flow path pipe 203. When an angle between the inner wall surface of the end part 221 and an imaginary plane ZX perpendicular to the central axis Y21 is referred to as "$\alpha 2$", the angle $\alpha 2$ is, for example, 0 to 90°. When an angle between the inner wall surface of the end part 222 and the outer circumferential surface of the flow path pipe 203 is referred to as "$\beta 2$", the angle $\beta 2$ is, for example, 0 to 90°. As described later, the central part 220 and the end parts 221 and 222 can be shaped by a spinning machining, and the angles $\alpha 2$ and $\beta 2$ can be easily adjusted by the spinning machining.

The central part 220 and the end parts 221 and 222 are mutually formed as an integrated article. That is, the boundaries between the central part 220 and the end part 221 and between the central part 220 and the end part 222 are not formed by joining a plurality of members, e.g., two plate materials by welding or crimping, but are formed from one raw material such as one plate material by performing a press shaping or a spinning machining. Therefore, the boundaries between the central part 220 and the end part 221 and between the central part 220 and the end part 222 have a strength higher than that of boundaries formed by joining a plurality of members.

The flow path pipe 203 is a roughly straight pipe including a suction part 231 that is connected to a catalyst converter or the like, a straight part 232 extending on a straight line from the suction part 231, and an outlet 233 connected to a main muffler or the like through a pipe or the like. Exhaust that has passed through the catalyst converter or the like is guided to the expansion chamber through the suction part 231 and the straight part 232. The exhaust guided into the expansion chamber is discharged to the outside of the tubular body 202 from the outlet 233. The straight part 232 may be a punching pipe in which a plurality of holes are formed. The outlet 233 is fixed to the end part 222 through a sealing member 4. A sound absorption member (not shown) is disposed in a space enclosed with the tubular body 202 and the flow path pipe 203, and envelops the outer circumferential surface of the straight part 232. The sound absorption member is a member made of a material capable of absorbing sound energy and thereby absorbing the sound. Examples of the sound absorption member include glass-wool.

Similarly to the sub-muffler 1 according to the first exemplary embodiment (see FIG. 1), the sub-muffler 201 is incorporated into an exhaust system 50 (see FIG. 2) of an automobile and supplements the silencing effect of a main muffler 53.

Further, since, similarly to the sub-muffler 1, the sub-muffler 201 has a roughly trapezoidal shape in cross section, the sub-muffler 201 can be housed in a vacant space 61 (see FIG. 2) in such a manner that gaps in the space 61 can be reduced more effectively while avoiding interferences caused by obstacles located in the lower part of the automobile in the width direction of the automobile. Therefore, the sub-muffler 201 can secure a large volume compared to a typical sub-muffler having a circular shape in cross section in related art.

Note that the sub-muffler 201 is disposed, for example, directly below a front floor tunnel section 260 of an automobile. As shown in FIG. 30, the front floor tunnel section 260 has a difference in height in the front/back direction of the automobile (Fr-direction in FIG. 30). For example, the front floor tunnel section 260 has roughly parallel surfaces 262, 264 and 266 roughly in parallel with the road surface, and inclined surfaces 263 and 265. The inclined surface 263 connects the roughly parallel surface 262 to the roughly parallel surface 264, and the inclined surface 265 connects the roughly parallel surface 264 to the roughly parallel surface 266. The roughly parallel surface 264 is located closer to the vehicle interior than the roughly parallel surfaces 262 and 266 are. Further, the roughly parallel surface 264 and the inclined surfaces 263 and 265 form a recessed part. Meanwhile, the end part 221, the central part 220, and the end part 222 of the sub-muffler 201 have surfaces that roughly conform to the inclined surfaces 263, 264 and 265, respectively. Therefore, it is possible to occupy the vacant space below the inclined surfaces 264, the roughly parallel surface 264, and the inclined surface 266 by the sub-muffler 201 more effectively and hence increase the volume of the sub-muffler 1.

Further, in some cases, the front floor tunnel section 260 includes, for example, a roughly parallel surface 262 roughly in parallel with the road surface in the front/back direction of the sub-muffler 201 as shown in FIG. 32. In this case, the central part 220 of the sub-muffler 201 has a surface roughly conforming to the roughly parallel surface 262. The outer shape of the central part 220 is shaped so as to conform to the shape of the wall surface forming the floor tunnel section 260, and hence the space formed between this wall surface and the surface of the central part 220 is occupied by the central part 220 while leaving only a predetermined clearance therebetween. Therefore, it is possible to occupy the vacant space below the roughly parallel surface 262 more effectively and hence increase the volume of the sub-muffler 201.

Further, similarly to the sub-muffler 1, the sub-muffler 201 can effectively use the conventional sub-muffler housing space.

Further, similarly to the sub-muffler 1, it is possible to increase the volume ratio of the sub-muffler, reduce the primary sound pressure magnitude, and reduce the noise caused by the exhaust by employing the sub-muffler according to the second exemplary embodiment.

Note that the present invention is not limited to the above-described exemplary embodiments, and modifications, improvements, and so on in which the object of the present invention can be achieved are also included in the scope of the present invention. For example, the sub-muffler 201 according to the second exemplary embodiment can be manufactured by using the above-described Manufacturing Methods 1 and 2. Further, although the sub-muffler 1 according to the first exemplary embodiment includes the separator inside the tubular body, the separator may be omitted. Further, although the sub-muffler according to the second exemplary embodiment uses the tubular body having a constant cross-sectional shape over its length, a tubular body having a cross-sectional shape that becomes smaller according to the position, such as the tubular body 2 (see FIG. 1), can be used. Further, although the diameter of the ends are reduced by a spinning machining in the spinning machining step S7 and the diameter reduction spinning machining step S27 in the above-described Manufacturing Methods 1 and 2, a diameter reduction machining method other than the spinning machining may be used to reduce the diameter of the ends in other embodiments. Examples of such diameter reduction machining methods include a drawing process and an extrusion process using dies, a press forming, and a swaging machining.

Note that although the tubular body has a roughly trapezoidal shape in cross section in each of the above-described first and second exemplary embodiments, the tubular body may have a rectangular shape other than the trapezoidal shape in cross section in other embodiments. Note that in this specification, the rectangular shape means various polygonal shapes such as a roughly trapezoidal shape, a roughly quadrangular shape, a roughly rectangular shape, a roughly square shape, a roughly octagonal shape, and other roughly polygonal shapes. That is, the rectangular shape does not mean only the perfect right-angled shape. For example, polygonal shapes in which some or all of the corners are rounded or cut are also included.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A manufacturing method of a sub-muffler comprising:
a rectangular tubular body shaping step of bending a plate material and thereby forming a rectangular tubular body having a rectangular shape in cross section;
a preliminary shaping step of preliminarily forming an end part of the rectangular tubular body and thereby shaping a cross-sectional shape of the end part of the rectangular tubular body into a circular shape; and
a diameter reduction shaping step of reducing a diameter of the end part of the rectangular tubular body.

2. The manufacturing method of a sub-muffler according to claim 1, wherein in the preliminary shaping step, a circular spinning machining in which a rotating roller is moved along a circular trajectory while pressing the rotating roller onto the end part of the rectangular tubular body is performed after performing a rectangular spinning machining in which the rotating roller is moved along a rectangular trajectory while pressing the rotating roller onto the end part of the rectangular tubular body.

3. The manufacturing method of a sub-muffler according to claim 1, wherein in the diameter reduction shaping step, a circular spinning machining in which a rotating roller is moved along a circular trajectory while pressing the rotating roller onto the end part of the rectangular tubular body is performed.

4. The manufacturing method of a sub-muffler according to claim 2, wherein in the preliminary shaping step, the trajectory of the rotating roller is gradually changed from a rectangular shape into a circular shape.

5. The manufacturing method of a sub-muffler according to claim 2, wherein in the preliminary shaping step, a press shaping is performed by using an inner press die and an outer press die.

6. A sub-muffler manufactured by using a manufacturing method according to claim 1.

7. A sub-muffler having a rectangular shape in cross section, the sub-muffler being housed in a floor tunnel extending in a longitudinal direction of a vehicle, the sub-muffler comprising:
a main body having a rectangular outer shape in cross section in a continuous fashion over its length in a longitudinal direction;
a first end part extending on a side of an inflow pipe, a cross sectional area of the first end part becoming smaller toward one side in the longitudinal direction of the main body, the inflow pipe being configured to feed exhaust into the main body; and
a second end part extending on a side of a discharging pipe, a cross sectional area of the second end part becoming smaller toward the other side thereof in the longitudinal direction of the main body, the discharging pipe being configured to discharge the exhaust from the main body, wherein an outer shape of the main body is shaped so as to conform to a shape of a wall surface forming the floor tunnel, and hence when the main body is housed in the floor tunnel, a space formed between the wall surface and an outer surface of the main body is occupied by the main body so as to leave only a predetermined clearance therebetween, wherein the main body and the first and second end parts are formed from one plate raw material.

* * * * *